United States Patent Office 3,361,744
Patented Jan. 2, 1968

3,361,744
NOVEL 17-HYDROCARBON SUBSTITUTED PROGESTERONES, INTERMEDIATES AND METHODS OF PREPARING THE SAME
Robert E. Schaub, Paramus, and Martin J. Weiss, Oradell, N.J., assignors to American Cyanamid Company, Stamford, Conn., a corporation of Maine
No Drawing. Filed July 18, 1962, Ser. No. 210,860
14 Claims. (Cl. 260—239.55)

This invention relates to novel 17α-substituted pregn-20-ones, to novel processes, involving steroid enolate anions, for preparing the same, and to novel related processes.

The compounds of this invention can be defined by the following formula:

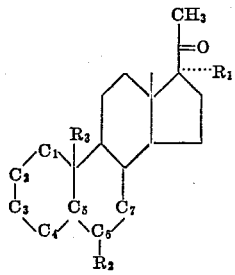

wherein $R_1$ is a member of the group consisting of alkyl having more than one carbon atom, lower alkenyl, and mononuclear aralkyl radicals; $R_2$ is a member of the group consisting of hydrogen, lower alkyl, nitro, trifluoromethyl and halogen radicals; $R_3$ is a member of the group consisting of hydrogen and methyl radicals; $-C_1-C_2-$ is a divalent radical of the group consisting of

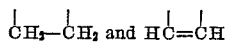

radicals; and

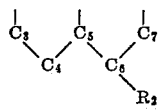

is a trivalent radical of the group consisting of:

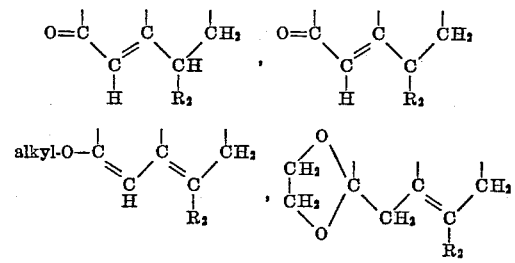

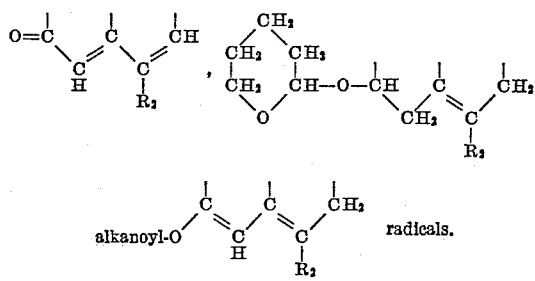

radicals.

The invention includes related compounds, such as, for example, 17α-methylpregna-1,4-diene - 3,20 - dione, 17α-methylpregna-4,6-diene - 3,20 - dione, 17α-methylpregna-1,4,6-triene - 3,20 - dione, 17α-methyl-6α-trifluoromethyl-progesterone, 17α-methyl-19-norprogesterone, 17α-methyl-6α-nitroprogesterone, and compounds of the formula:

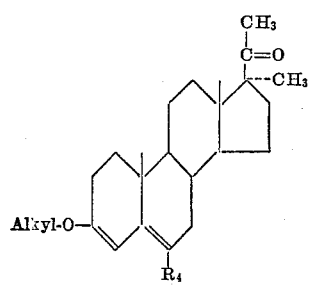

wherein $R_4$ is a member of the group consisting of hydrogen and lower alkyl radicals.

One of the novel aspects of this invention is the procedure found useful for the introduction of the 17α-substituent. According to our novel process this substituent can be introduced by treatment of an appropriate pregn-20-one 17-metal derivative, otherwise designated a 17-steroid enolate salt, with a reagent for alkylating, aralkylating or alkenylating (e.g. methyl iodide, propyl iodide, butyl bromide, benzyl bromide, allyl chloride, etc.).

As presently understood, these pregna-20-one 17-metal derivatives are enolate salts in which the steroid enolate ion has a negative charge distributed between the C-17 position and the oxygen atom of the 20-carbonyl group. Structure A hereinafter is representative of this concept. These derivatives may also be described as the resonance hybrids resulting from contributions by two major resonance forms represented hereinafter by structures B and C. In these structures, M represents a member of the group consisting of alkali and alkaline earth metals. In the instances of the aklali metals it is monovalent, and in the instances of the alkaline earth metals it is divalent. In the latter circumstances two steroid anions will be associated with each divalent cation, although for purposes of convenience in the structures below only one such anion is shown. This invention also includes these novel and useful pregn-20-one 17-metal derivatives.

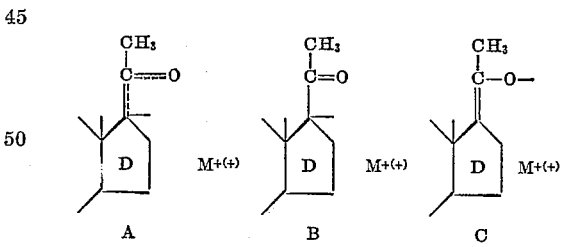

The 17-steroid enolate salts (A) can be prepared in several ways and these novel procedures also constitute a part of this invention. These compounds are obtained by treatment of appropriate pregn-16-en-20-ones (G), 17α-acyloxypregn-20-ones (D), 17β - acyloxy-17α-pregn-20-ones (E), 17α-halopregn-20-ones (I), 17β-halo-17α-pregn-20-ones (J), 17α-hydroxypregn-20-ones (F) or 17β-hydroxy-17α-pregn-20-ones (K) with an alkali metal or an alkaline earth metal, preferably lithium, calcium or barium, in a solvent, preferably liquid ammonia. Other solvents can be, for example, the primary alkyl amines (e.g. ethyl amine, isopropyl amine) and the N-alkylanilines (e.g. N-methylaniline). Treatment of the pregn-20-one 17-metal derivative (A) with the appropriate alkylating, alkenylating, or aralkylating agent is then productive of the desired 17α-substituted pregn-20-one (H).

The formation of the 17-steroid enolate salts (A) and their subsequent conversion to the 17α-substituted pregn-20-ones (H) can be illustrated as follows:

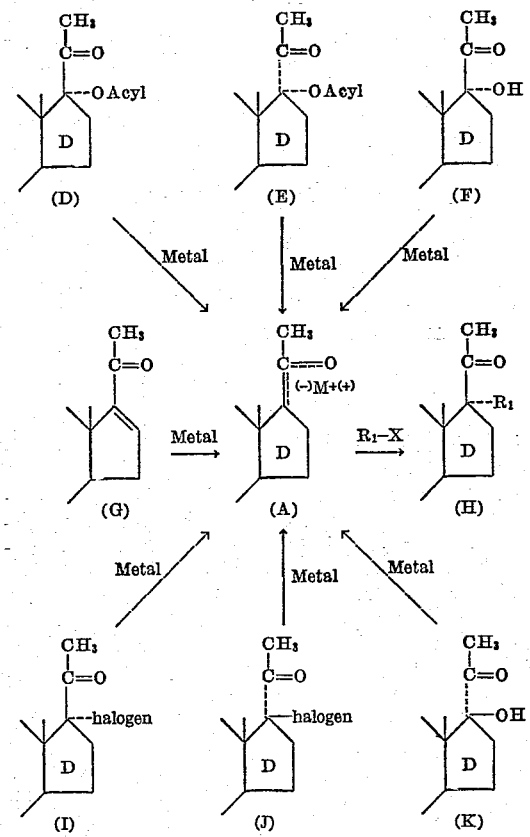

In a further application of this process a 17α or 17β cyano (L-O) or a 17α or 17β-carbalkoxy (Q-T) steroid having a 17-hydroxy, halogen or acyloxy group or a 16,17-double bond is treated with an alkali or alkaline earth metal, preferably in liquid ammonia solution, to give an intermediate enolate anion (P,U) which will undergo alkylation, alkenylation or aralkylation to give the intermediate 17α-substituted etianic acid derivative (V,W) which can then be converted into the corresponding 17α-substituted pregn-20-one derivative (Y) by, for example, reaction with methyl magnesium iodide. These transformations can be illustrated as follows:

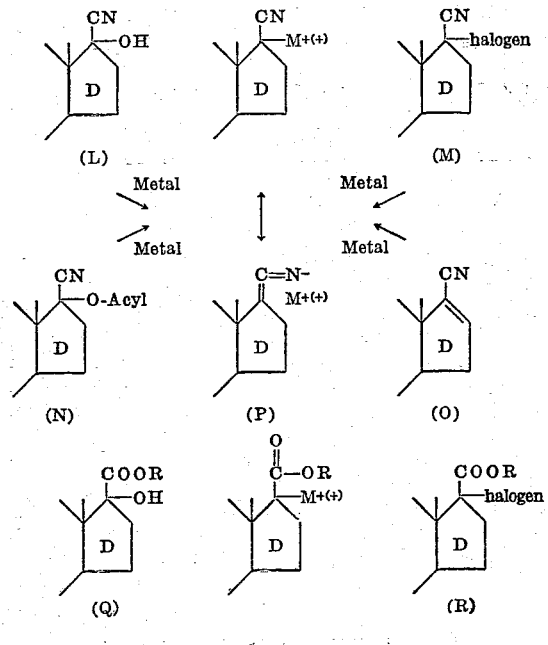

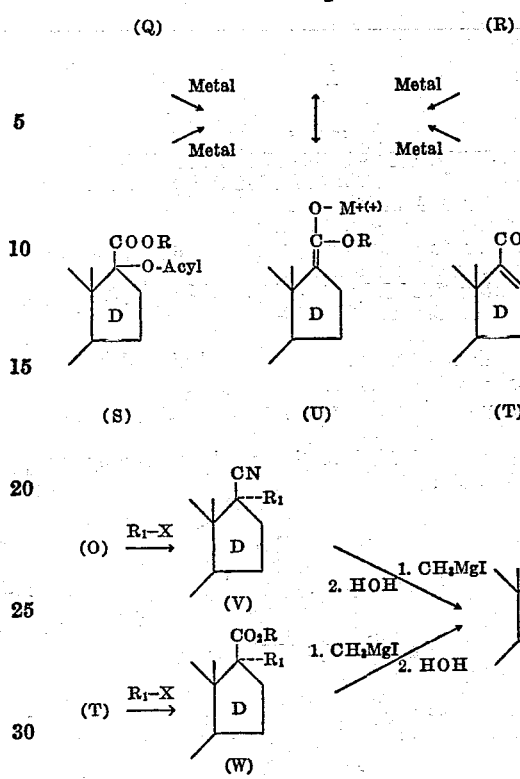

The methods heretofore described in the literature for the preparation of 17α-methylpregn-20-ones are complex and difficult involving many steps and the formation of geometrical isomers (Fieser and Fieser in "Steroids" pages 560–562). In contrast, the process of the present invention, which involves the development of appropriate enolate anions, produces 17α-methyl and other 17α-substituted progesterones in two or three steps, usually in good yield, from readily available and relatively cheap starting materials such as 16-dehydro-20-ketones.

The other transformations for the preparation of the compounds of this invention are carried out by procedures well known in the steroid art. Thus, if necessary, the $\Delta^4$-3-keto moiety is elaborated by hydrolysis of the corresponding ketal or enol ether derivatives or by oxidation by the Oppenauer or other procedures of $\Delta^5$-3β-hydroxy derivatives. The 1,2-double bond can be introduced into a $\Delta^4$-3-keto moiety or a $\Delta^{4,6}$-3-keto moiety by dehydrogenation with 2,3-dichloro-5,6-dicyanobenzoquinone, selenium dioxide or by microbiological procedures well known in the fermentation arts. The 6,7-double bond is introduced by dehydrogenation with dichlorodicyanobenzoquinone in the presence of acid or with chloranil or by treatment of a 6-halo-$\Delta^4$-3-ketone with basic reagents such at collidine or calcium carbonate in solvents such as dimethylformamide or dimethylacetamide. The 6,7 and the 1,2-dobule bonds can be simultaneously introduced by treatment of the $\Delta^4$-3-ketone with chloranil under appropriate conditions. The 6-halo derivatives can be obtained by treatment of enol ethers or enol acetates with halogenating reagents such as N-chlorsuccinimide or N-bromacetamide for introduction of chlorine or bromine, respectively, and with perchloryl fluoride for the introduction of fluorine. When necessary, an initially formed 6β-halo-$\Delta^4$-3-ketone can be epimerized, on acid treatment, to the corresponding 6α-halo derivative.

The compounds of this invention are generally white, crystalline substances and are isolated by the usual techniques of crystalliaztion and chromatography.

The various reactions are illustrated by the following flowsheet:
FLOWSHEET
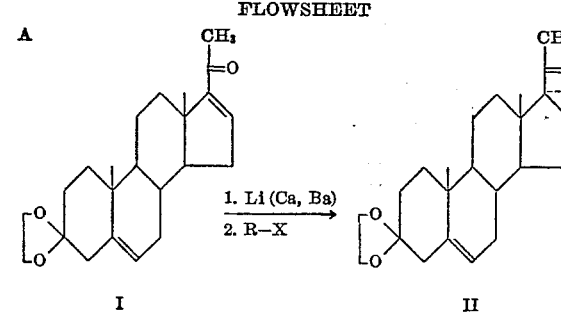
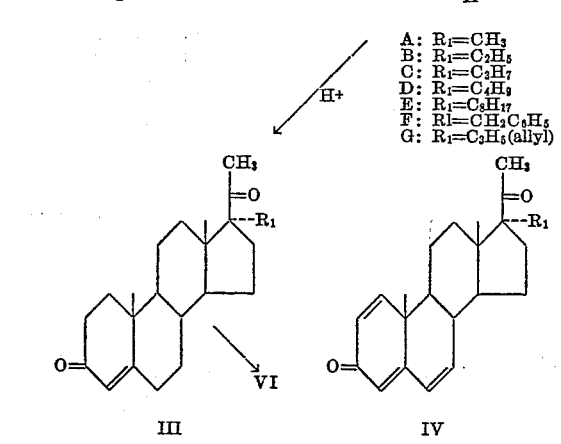
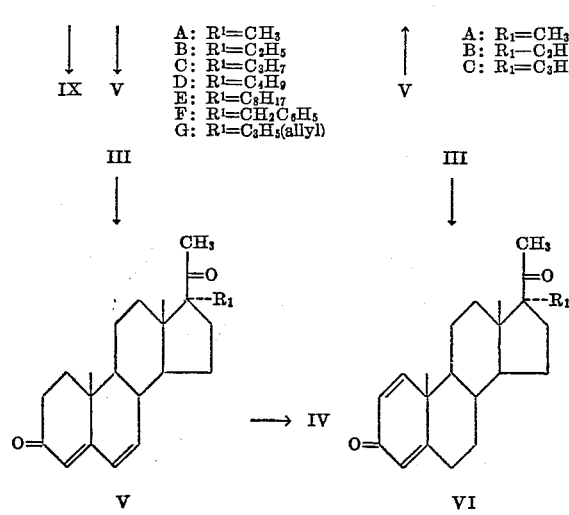
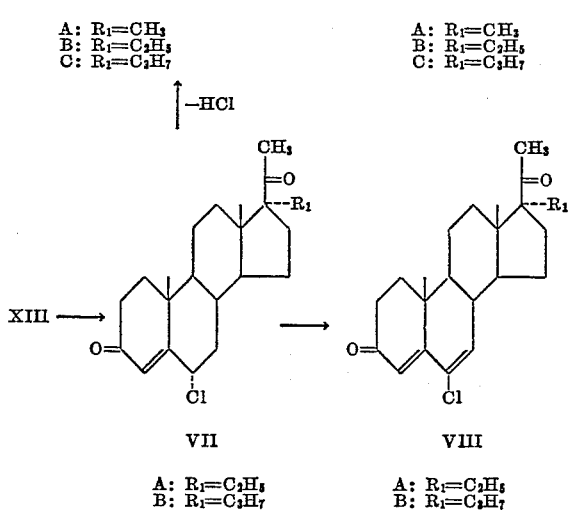
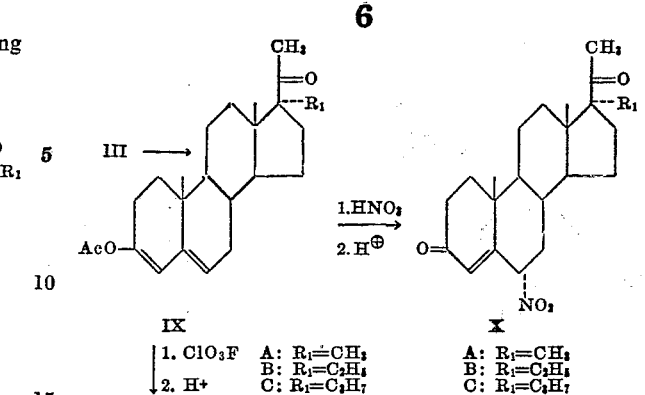
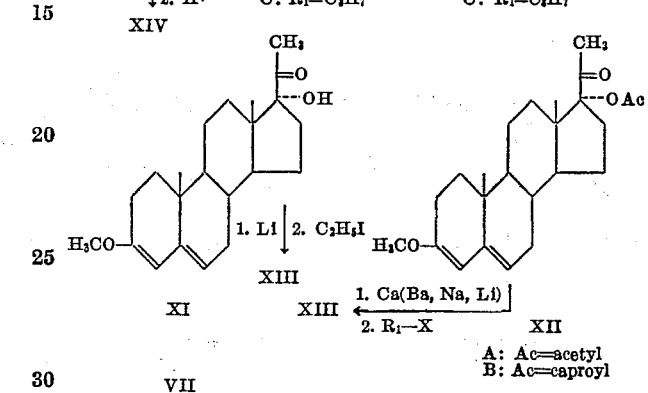
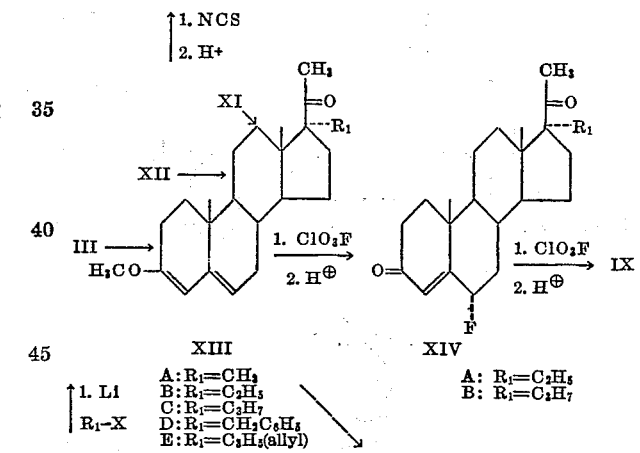
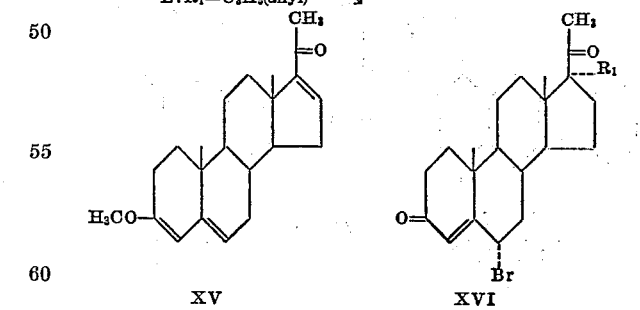
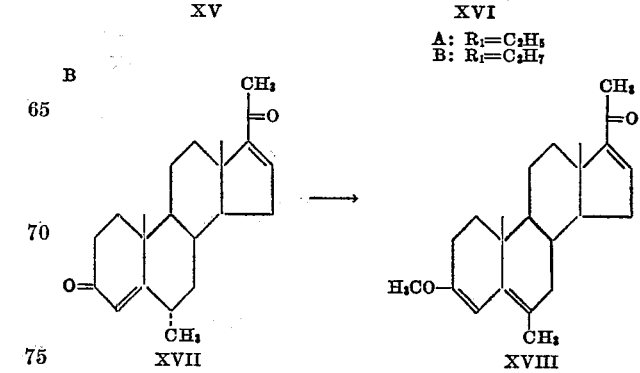

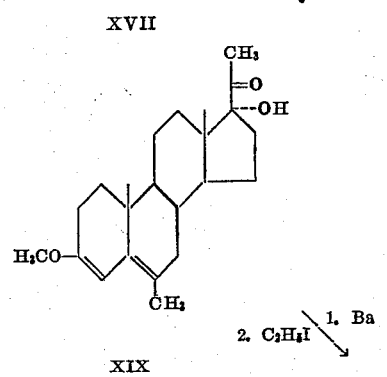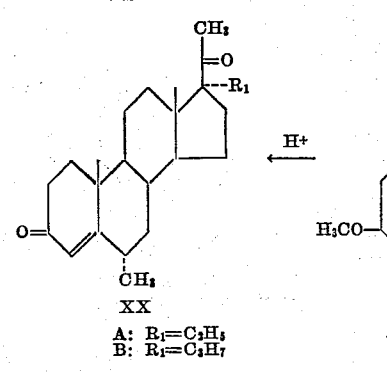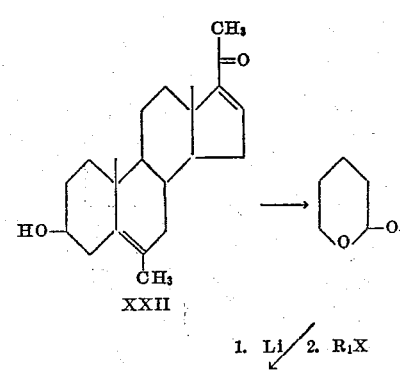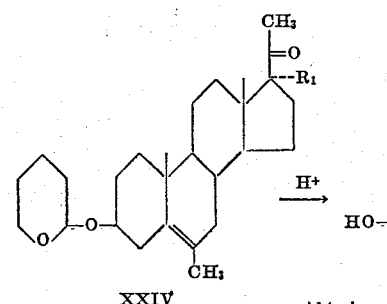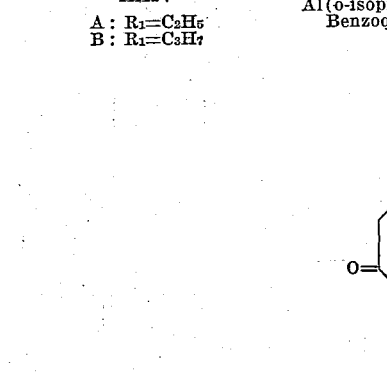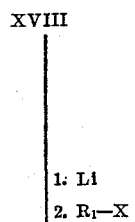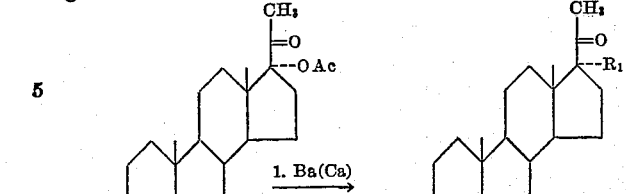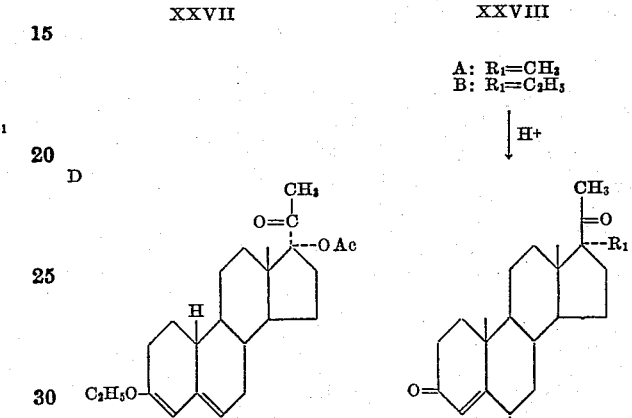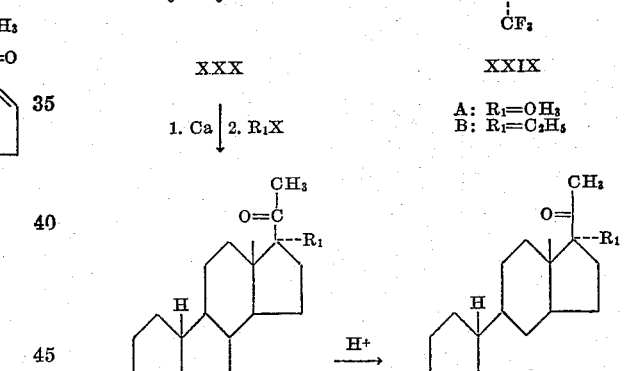
The following transformations further illustrate the broad applicability of the novel alkylation process of this invention.
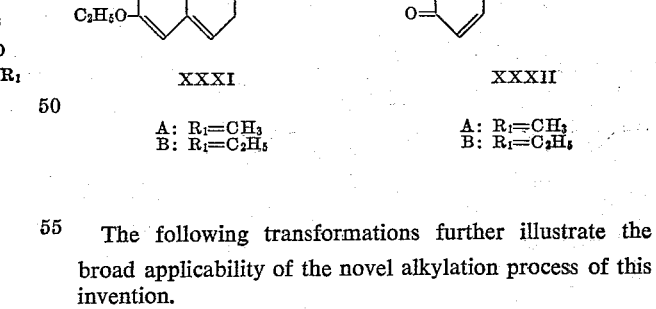

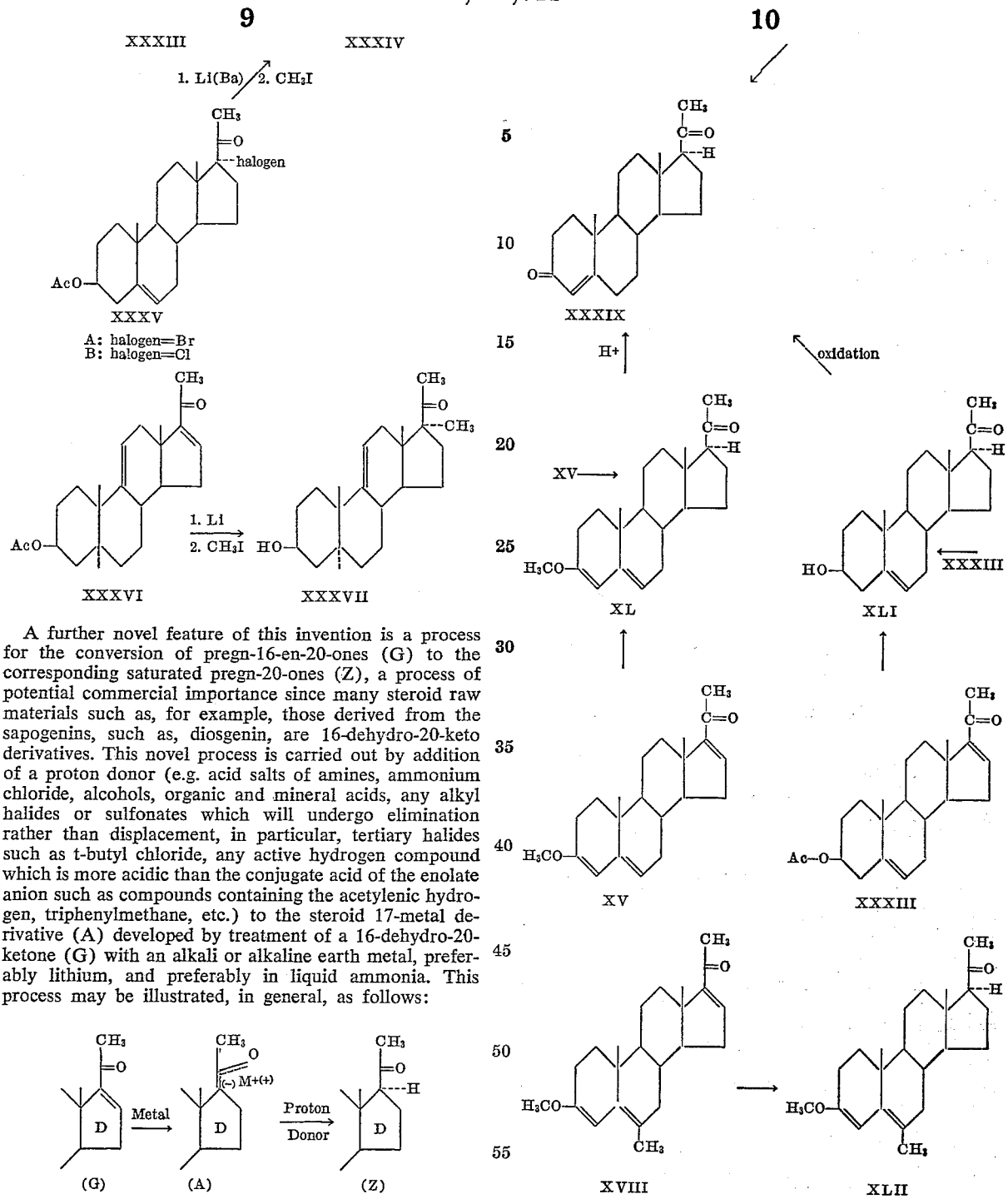

A further novel feature of this invention is a process for the conversion of pregn-16-en-20-ones (G) to the corresponding saturated pregn-20-ones (Z), a process of potential commercial importance since many steroid raw materials such as, for example, those derived from the sapogenins, such as, diosgenin, are 16-dehydro-20-keto derivatives. This novel process is carried out by addition of a proton donor (e.g. acid salts of amines, ammonium chloride, alcohols, organic and mineral acids, any alkyl halides or sulfonates which will undergo elimination rather than displacement, in particular, tertiary halides such as t-butyl chloride, any active hydrogen compound which is more acidic than the conjugate acid of the enolate anion such as compounds containing the acetylenic hydrogen, triphenylmethane, etc.) to the steroid 17-metal derivative (A) developed by treatment of a 16-dehydro-20-ketone (G) with an alkali or alkaline earth metal, preferably lithium, and preferably in liquid ammonia. This process may be illustrated, in general, as follows:

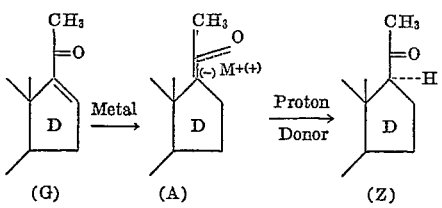

Examples of the specific application of this process are given by the following equations:

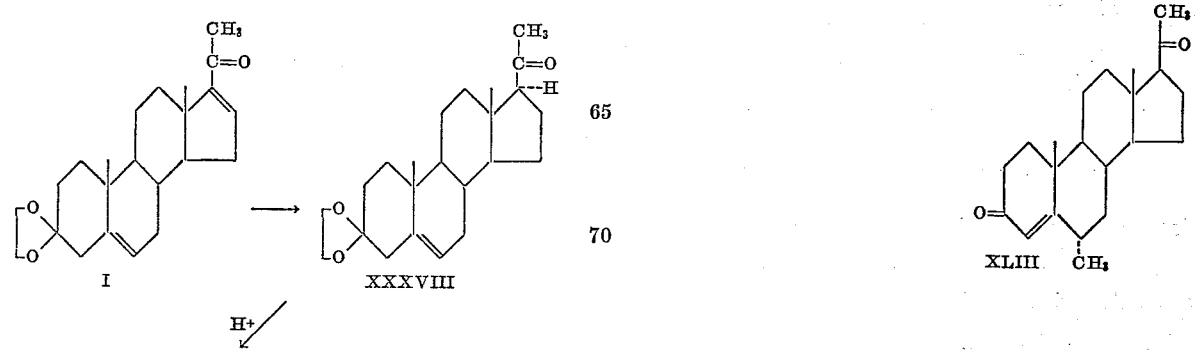

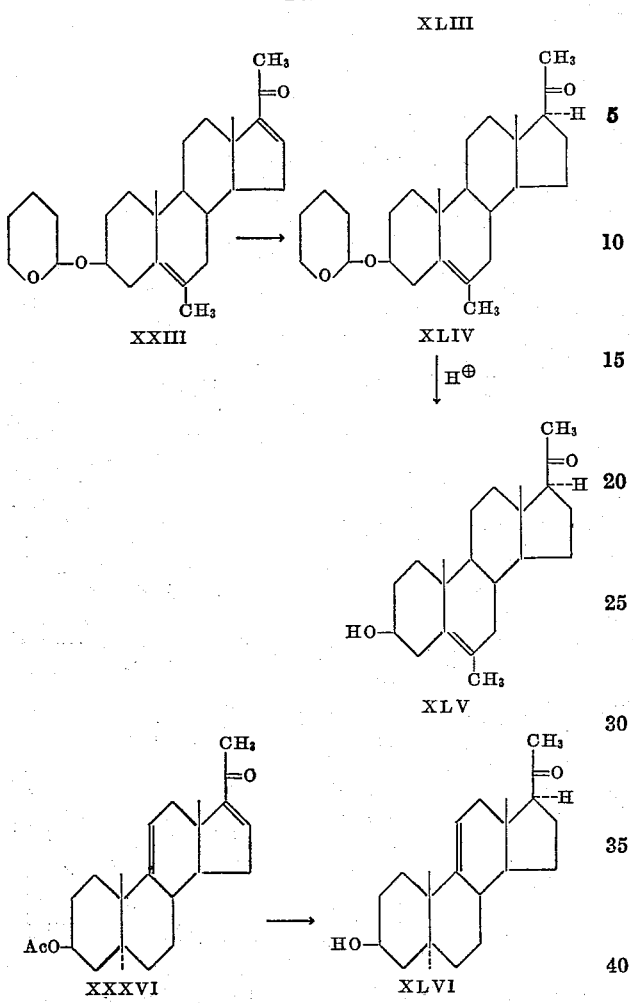

The novel compounds of this invention possess progestational activity and are useful in place of known progestational steroids, such as progesterone, in the treatment, for example, of habitual abortion. These compounds have an additional utility in that they are effective when administered by the oral route. For example, when 17α-ethylprogesterone was given to estrogen primed immature female rabbits by oral administration once daily for five days and the uteri prepared for histological examination, a five milligram total dose was found to be equivalent in activity to a five milligram total oral dose of 17α-acetoxyprogesterone, a well known clinically useful progestational agent. By the same oral assay 17α-propylprogesterone exhibited a similar activity. The present compounds are also useful by oral administration for inhibition of conception. The present process also gives a method of preparing 17α-methylprogesterone. This process is also useful for conversion of available 16-dehydro-20-ketones to saturated 20-ketones, for example, in the preparation of progesterone.

The following examples illustrate in detail the preparation of the 17α-substituted pregn-20-one compounds of the present invention.

*Example 1.—Preparation of 3-ethylenedioxy-17α-methylpregn-5-en-20-one (IIA)*

A solution containing 40 g. of 3-ethylenedioxy-pregna-5,16-dien-20-one (I) [F. Sondheimer, et al. J. Am. Chem. Soc. 77, 192 (1955)] in 750 ml. of purified tetrahydrofuran is added in a steady stream to a stirred solution containing 1.55 g. of lithium in about 2000 ml. of liquid ammonia (dried by prior addition of minimum pieces of lithium until the blue color is retained). Toward the end of the addition the blue color gradually disappears until at the very end of the addition the color is completely discharged, giving a milky solution of the enolate salt, 3-ethylenedioxypregn-5-en-20-one 17-lithio derivative. A solution containing 40 ml. of methyl iodide in 70 ml. of tetrahydrofuran is added dropwise and the resulting solution stirred for one hour. After an additional 40 ml. of methyl iodide is added, the solution is stirred for 18 hours. Ammonium chloride (20 g.) is added followed by 1000 ml. of water and 1000 ml. of ether. The aqueous layer is extracted with an additional 500 ml. of ether. The combined extracts are washed with water, dried with anhydrous magnesium sulfate and evaoprated to dryness leaving a solid. Recrystallization from acetone gives 27 g. (65%) of 3-ethylenedioxy-17α-methyl-pregn-5-en-20-one (IIA) in two crops, melting point 157–162° C. Further recrystallization from acetone-petroleum ether (boiling point 60–70°) raises the melting point to 167–170°. The material has no significant ultraviolet absorption at 20γ/ml.;

$[\alpha]_D^{25} -31.6°$ (0.95% in $CHCl_3$); $\lambda_{max}^{KBr}$ 5.86, 9.07μ

*Example 2.—Preparation of 3-ethylenedioxy-17α-methylpregn-5-en-20-one (IIA)*

In the manner described in Example 1, a solution of 0.216 g. of calcium in about 300 ml. of dry liquid ammonia is treated by dropwise addition with a solution of 1.92 g. of 3-ethylenedioxypregna-5,16-dien-20-one (I) in 110 ml. of tetrahydrofuran until the blue color disappears, giving a suspension of the enolate salt, 3-ethylenedioxypregn-5-en-20-one 17-calcium derivative. The reaction mixture then is treated with 5 ml. of methyl iodide and stirred at room temperature for 16 hours whereafter a solution of 2.0 g. of ammonium chloride in 100 ml. of water is added. The crude product is isolated with ether and chromatographed on silica gel. The solids eluted early by a 5% ether-in-benzene solution are recrystallized from acetone-petroleum ether (boiling point 60–70°) to give white prisms, melting point 165–171° C. Admixture with a specimen from Example 1 gives no depression in melting range.

*Example 3.—Preparation of 3-ethylenedioxy-17α-methylpregn-5-en-20-one (IIA)*

In the manner described in Example 1, a solution of 1.439 g. of barium in about 500 ml. of dry liquid ammonia is treated by dropwise addition with a solution of 3.74 g. of 3-ethylenedioxypregna-5,16-dien-20-one (I) in 170 ml. of tetrahydrofuran until the blue color disappears, giving a suspension of the enolate salt, 3-ethylenedioxypregn-5-en-20-one 17 barium derivative. The reaction mixture then is treated with 10 ml. of methyl iodide and stirred at room temperature for 18 hours, whereafter a solution of 4.0 g. of ammonium chloride in 100 ml. of water is added. The crude product is isolated with ether and chromatographed on silica gel. The solids eluted early by a 5% ether-in-benzene solution are recrystallized from acetone-petroleum ether (boiling point 60–70°) to give white prisms, melting point 163–169° C. Admixture with a specimen from Example 1 gives no depression in melting range.

*Example 4.—Preparation of 17α-methylprogesterone (IIIA)*

A solution of 15 g. of 3-ethylenedioxy-17α-methylpregn-5-en-20-one (IIA, Example 1) in 950 ml. of reagent methanol containing 93 ml. of 8% sulfuric acid (v./v.) is refluxed for 45 minutes. The solution is concentrated to turbidity in vacuo, diluted with 200 ml. of water and extracted with methylene chloride (2×200 ml.). The combined extracts are washed with water, dried with anhydrous magnesium sulfate and evaporated to dryness in vacuo. The resulting solid is recrystallized from acetone-petroleum ether (boiling point 60–70°) to give 10.9 g. (82%) of 17α-methylprogesterone (IIIA), melting point 120–125° C. Recrystallization from ether-petroleum either (boiling point 60–70°) gives white crystals IIIA; melting point 130–133° C.;

$[\alpha]_D^{25} +112°$ (0.92% in $CHCl_3$); $\lambda_{max.}^{MeOH}$ 242 m$\mu$ ($\epsilon = 15{,}800$); $\lambda_{max.}^{KBr}$ 5.86, 5.95, 6.16$\mu$

*Example 5.—Preparation of 3-methoxy-17α-methyl-pregna-3,5-dien-20-one (XIIIA)*

To a solution of 5 g. of 17α-methylprogesterone (Example 4) (IIIA) in 50 ml. of dioxane, 1.5 ml. of methanol and 20 ml. of methyl orthoformate is added 1.3 ml. of a solution of 5% sulfuric acid in dioxane. After 15 minutes the solution is quenched with 10 ml. of pyridine, poured into 350 ml. of water and the separated gum is extracted with several portions of methylene chloride. The combined extracts are washed with water, dried with anhydrous magnesium sulfate and evaporated to dryness under reduced pressure. Trituration of the residue with methanol followed by filtration gives 3.88 g. (75%) of product (XIIIA) melting point 132–137° C. Recrystallization from methanol gives white crystals of the above product with melting point 138–144° C.;

$[\alpha]_D^{25} -40°$ (0.94% in $CHCl_3$); $\lambda_{max.}^{MeOH}$ 239 m$\mu$ ($\epsilon = 17{,}100$); $\lambda_{max.}^{KBr}$ 5.89, 6.04, 6.14$\mu$

*Example 6.—Preparation of 3-methoxy-17α-methyl-pregna-3,5-dien-20 (XIIIA)*

In the manner described in Example 1, a solution of 69 mg. of lithium in about 200 ml. of liquid ammonia is treated, by dropwise addition, with a solution of 1.6 g. of 3-methoxypregna-3,5,16-trien-20-one (XV) [A. L. Nussbaum et al., J. Org. Chem., 26, 3925 (1961)] in 25 ml. of tetrahydrofuran. The resulting enolate salt, 3-methoxypregna-3,5-diene-20-one 17-lithio derivative, is treated with excess methyl iodide and after stirring overnight at room temperature, the crude product is isolated with ether and chromatographed on silica gel. The solids eluted with 2½% ether-in-benzene are recrystallized from methanol to give white crystals, melting point 123–128° C. This material is identical in all respects with that obtained in Example 5.

*Example 7.—Preparation of 17α-acetoxy-3-methoxy-pregna-3,5-dien-20-one (XIIA)*

A solution of 14.8 g. of 17α-acetoxyprogesterone in 148 ml. of methylorthoformate, 112.5 ml. of dioxane, 0.75 ml. of concentrated sulfuric acid and 0.75 ml. of methanol is allowed to stand at room temperature for 15 minutes. The solution is poured, with stirring, into 1000 ml. of water and the yellow precipitate is collected by filtration. The air-dried crude product is recrystallized from methanol containing a trace of pyridine to give 10.1 g. of XIIA, melting point 178–182°;

$\lambda_{max.}^{KBr}$ 5.74, 5.83, 6.03, 6.14$\mu$

*Example 8.—Preparation of 3-methoxy-17α-methyl-pregna-3,5-dien-20-one (XIIIA)*

By the procedure described in Example 1, a solution of calcium metal (105 mg.) in anhydrous liquid ammonia is treated with a tetrahydrofuran solution of 17α-acetoxy-3-methoxypregna-3,5-dien-20-one (XIIA, Example 7) to the point of color discharge. To the resulting enolate salt, 3-methoxypregna-3,5-dien-20-one 17-calcium derivative, excess methyl iodide is added and the reaction mixture is stirred for 18 hours. To the resulting white suspension excess ammonium chloride is added. The mixture is partitioned between water and methylene chloride. The methylene chloride phase is dried over magnesium sulfate and then evaporated to give a gum (310 mg.), which on crystallization from methanol affords 90 mg. of the above product XIIIA as crystalline material with a M.P. 105–115°;

$\lambda_{max.}^{KBr}$ 5.90, 6.03, 6.13$\mu$

Hydrolysis of this product (XIIIA) with dilute aqueous-methanolic hydrochloric acid gives 17α-methylprogesterone (IIIA), melting at 117–125° C. after recrystallization from methanol. Admixture of this substance with progesterone results in a depression of melting point and admixture with authentic 17α-methylprogesterone (IIIA) does not depress the melting point.

*Example 9.—Preparation of 3-methoxy-17α-methyl-pregna-3,5-dien-20-one (XIIIA)*

In the manner described in Example 1, a solution of 0.5 g. of sodium in about 400 ml. of dry liquid ammonia is treated by dropwise addition with a solution of 4.2 g. of 17α - acetoxy - 3-methoxypregna-3,5-dien-20-one (XIIA, Example 7) in 50 ml. of tetrahydrofuran until the blue color is discharged. The reaction mixture containing the enolate salt, 3-methoxypregna-3,5-dien-20-one 17-sodio derivative, is then treated with 10 ml. of methyl iodide and stirred at room temperature for 18 hours whereafter a solution of 5 g. of ammonium chloride in 100 ml. of water is added. The crude product is isolated with ether and recrystallized from methyl alcohol to give white crystals, M.P. 130–135°. This material is identical in all respects with that obtained in Example 5.

Treatment of this material in the manner described in Example 10 affords 17α-methylprogesterone (IIIA) identical in all respects to the product obtained in Example 4.

*Example 10.—Preparation of 17α-methylprogesterone (IIIA)*

A suspension of 140 mg. of 3-methoxy-17α-methyl-pregna-3,5-dien-20-one (XIIIA, Example 6) in 4.4 ml. of methanol containing 0.22 ml. of 2 N hydrochloric acid is stirred at room temperature for 18 hours, solution being complete in about one hour. Diluted with water, the solution is extracted with methylene chloride and the combined extracts are washed with water, dried with anhydrous magnesium sulfate and evaporated to dryness under reduced pressure. Trituration of the residue with petroleum ether gives white crystals identical with the product obtained in Example 4.

*Example 11.—Preparation of 3-ethylenedioxy-17α-ethylpregn-5-en-20-one (IIB)*

In the manner described in Example 1, a solution of 2.70 g. of lithium in about 3000 ml. of liquid ammonia is treated by dropwise addition with a solution of 80 g. of 3-ethylenedioxypregna-5,16-dien-20-one (I) in 1100 ml. of tetrahydrofuran until the color disappears. The resulting enolate salt, 3-ethylenedioxypregn-5-en-20-one 17-lithio derivative is then treated with 95 ml. of ethyl iodide and stirred at room temperature for 18 hours. The crude product is isolated with ether and crystallized from ether-petroleum ether (boiling point 60–70°) to give white crystals of the above product, melting point 164–167° C. This material has no ultraviolet absorption at 20γ/ml., $[\alpha]_D^{25} +11°$ (0.99% in $CHCl_3$); $\lambda_{max.}^{KBr}$ 5.85, 9.00$\mu$

*Example 12.—Preparation of 17α-ethylprogesterone (IIIB)*

A solution of 22.4 g. of 3-ethylenedioxy-17α-ethylpregn-5-en-20-one (IIB, Example 11) in 1000 ml. of methanol containing 120 ml. of 8% (v./v.) sulfuric acid is refluxed for 40 minutes and then evaporated until solid is formed. Water is added and the solid collected by filtration to give the crude product. Recrystallization from ether-petroleum ether (boiling point 60–70°) gives 17α-ethylprogesterone (IIIB), melting point 148–149° C.

*Example 13.—Preparation of 17α-ethyl-3-methoxy-pregna-3,5-dien-20-one (XIIIB)*

In the manner described in Example 5, a solution of 2.0 g. of 17α-ethylprogesterone (IIIB, Example 12), 20 ml. of dioxane, 0.6 ml. of reagent methanol and 8 ml. of methyl orthoformate is treated with 0.52 ml. of a 5% sulfuric acid-dioxane solution (v./v.). The reaction mixture is allowed to stand at room temperature for 15 minutes, after which time the mixture is then poured into 150 ml. of water and stirred for several hours. The crude product is filtered and recrystallized from methanol to give 1.41 g. of white crystals of the product above with melting point 131–136° C., $\lambda_{max}^{CH_3OH}$ 239 m$\mu$ ($\epsilon$ 20,000); $\lambda_{max}^{KBr}$ 5.9, 6.02, 6.12$\mu$

*Example 14.—Preparation of 17α-ethyl-3-methoxypregna-3,5-dien-20-one (XIIIB)*

In the manner described in Example 1, a solution of 2.15 g. of barium metal in about 350 ml. of dry liquid ammonia is treated, by dropwise addition, with a solution of 4.3 g. of 17α-acetoxy-3-methoxypregna-3,5-dien-20-one of 4.3 g. of (XIIA, Example 7) in 50 ml. of tetrahydrofuran until the blue color disappears. The enolate salt, 3-methoxypregna-3,5-dien-20-one 17-barium derivative, is then treated with 20 ml. of ethyl iodide and stirred at room temperature for 18 hours, whereafter a solution of 5.0 g. of ammonium chloride in 100 ml. of water is added. The reaction mixture is extracted with methylene chloride, and the organic phase is washed with water, dried with anhydrous magnesium sulfate and evaporated to dryness in vacuo. The residue is crystallized from methanol to give the above product XIIIB with M.P. 130–140° C. This material is identical in all respects with that obtained in Example 13.

*Example 15.—Preparation of 3-methoxy-17α-caproyloxypregna-3,5-dien-20-one (XIIB)*

Treatment of 17α-caproyloxyprogesterone [E. Batres, et al., J. Org. Chem., 21, 239 (1956)] with methyl orthoformate by the procedure of Example 7 is productive of 3-methoxy-17α-caproyloxypregna-3,5-dien-20-one (XIIB) obtained as white crystals;

$\lambda_{max}^{CH_3OH}$ 239 m$\mu$ ($\epsilon$ 19,500)

*Example 16.—Preparation of 17α-ethyl-3-methoxypregna-3,5-dien-20-one (XIIIB)*

Treatment of 3 - methoxy - 17α - caproyloxypregna-3,5-dien-20-one (XIIA, Example 15) with a solution of barium metal in liquid ammonia by the procedure of Example 1 and subsequent treatment of the resulting enolate salt, 3-methoxypregna-3,5-dien-20-one 17-barium derivative, with excess ethyl iodide is productive of 17α-ethyl-3-methoxypregna-3,5-dien-20-one (XIIIB) as white crystals, M.P. 130–140°; identical by infrared and mixture melting point comparisons with the material obtained in Example 13.

*Example 17.—Preparation of 17α-hydroxy-3-methoxypregna-3,5-dien-20-one (XI)*

A solution of 7.93 g. of 17α-hydroxyprogesterone, 211 mg. of p-toluenesulfonic acid monohydrate, 66 ml. of 2,2-dimethoxypropane, 66 ml. of dimethylformamide and 2.64 ml. of methanol is heated at reflux for 3 hours. Sodium bicarbonate is added to the cooled solution which is then poured, with stirring, into a large volume of water. The solid is collected by filtration and recrystallized from methanol containing a trace of pyridine to give the above product XI as white crystals, melting point 145–156° C.

*Example 18.—Preparation of 17α-ethyl-3-methoxypregna-3,5-dien-20-one (XIIIB)*

In the manner described in Example 1, a solution of 121 mg. of lithium in about 300 ml. of dry liquid ammonia is treated, by dropwise addition, with a solution of 3.243 g. of 3-methoxy-17α-hydroxypregn-3,5-dien-20-one (XI, Example 17) in 25 ml. of tetrahydrofuran until the bluue color disappears. The resulting enolate salt, 3-methoxypregna-3,5-dien-20-one 17-lithio derivative, is treated with 12 ml. of ethyl iodide and stirred at room temperature for 18 hours, whereafter a solution of 5 g. of ammonium chloride in 100 ml. of water is added. The reaction mixture is extracted with methylene chloride. The extract is washed with water, dried over magnesium sulfate and concentrated to dryness in vacuo. Trituration of the residue with methanol followed by filtration gives the above product (XIIIB), melting point 133–143° C. This material is identical in all respects with that obtained in Example 14.

*Example 19.—Preparation of 17α-ethylprogesterone (IIIB)*

A solution of 2.40 g. of 17α-ethyl-3-methoxypregna-3,5-dien-20-one (XIIIB) in 100 ml. of reagent methanol containing 25 ml. of 3 N hydrochloric acid is refluxed for 40 minutes. The solution is concentrated to turbidity in vacuo, diluted with water and extracted with methylene chloride. The combined extracts are washed with water, dried with anhydrous magnesium sulfate and evaporated to dryness in vacuo. Trituration of the residue with methanol followed by filtration gives the above product. Recrystallization of this product from methanol gives white crystals, melting point 146–147° C. This material is identical in all respects with that obtained in Example 12.

*Example 20.—Preparation of 3-ethoxy-17α-ethylpregna-3,5-dien-20-one*

In the manner described in Example 5, a solution consisting of 17α-ethylprogesterone (Example 12) (2.0 g.), dioxane (20 ml.), ethanol (0.6 ml.), ethyl orthoformate (8 ml.) and 5% (v./v.) sulfuric acid-dioxane solution (0.5 ml.) is allowed to stand at room temperature for 15 minutes, after which time the reaction is quenched with excess pyridine. The resulting mixture is drowned in water and the crude product is filtered and recrystallized from ethanol to give white crystals of the above product with $\lambda_{max}^{CH_3OH}$ 239 m$\mu$ ($\epsilon$ 19,000) and $\lambda_{max}^{KBr}$ 5.9, 6.02, 6.12$\mu$

*Example 21.—Preparation of 17α-ethyl-3-propoxypregna-3,5-dien-20-one*

In the manner described in Example 5, a solution consisting of 17α-ethylprogesterone (IIIB, Example 12) (2.0 g.), dioxane (20 ml.), n-propanol (0.6 ml.), n-propyl orthoformate (8 ml.) and 5% (v./v.) sulfuric acid-dioxane solution (0.5 ml.) is allowed to stand at room temperature for 30 minutes, after which time the reaction is quenched with excess pyridine. The resulting mixture is drowned in water and the crude product is filtered, washed with water and recrystallized from methanol to give the above product with $\lambda_{max}^{CH_3OH}$ 239 m$\mu$ ($\epsilon$ 19,000) and $\lambda_{max}^{KBr}$ 5.9, 6.02, 6.12$\mu$

*Example 22.—Preparation of 3-ethylenedioxy-17α-propylpregn-5-en-20-one (IIC)*

In the manner described in Example 1, a solution of 97.2 mg. of lithium in about 300 ml. of anhydrous liquid ammonia is treated, by dropwise addition, with a solution of 2.5 g. of 3-ethylenedioxypregna-5,16-dien-20-one in 70 ml. of tetrahydrofuran until the blue color disappears. The reaction mixture containing the enolate salt, 3-ethylenedioxypregn-5-en-20-one 17-lithio derivative, then is treated with 10.52 ml. of n-propyl iodide in 25 ml. of tetrahydrofuran and stirred at room temperature for 16 hours, whereafter a solution of 2 g. of ammonium chloride in 100 ml. of water is added. The crude product is isolated with ether and chromatographed on Florisil. The solids eluted with benzene are recrystallized from methylene chloride-petroleum ether (30–60°) to give white crystals of desired product, melting point 148–150° C.;

$\lambda_{max}^{KBr}$ 5.88, 9.05$\mu$; $[\alpha]_D^{25} = -42.6°$ (c.=0.633 in CHCl$_3$)

Example 23.—Preparation of 17α-propylprogestrone (IIIC)

In the manner described in Example 4, a solution of 251 mg. of 3-ethylenedioxy-17α-propylpregn-5-en-20-one (IIC, Example 22) in 32 ml. of methanol containing 3.76 ml. of 8% (v./v.) of sulfuric acid is refluxed for 40 minutes. The reaction is concentrated to turbidity and water is added. The reaction mixture is extracted with methylene chloride. The extract is washed with water, dried over magnesium sulfate and concentrated to dryness in vacuo. The crude product is recrystallized from ether-petroleum ether (30–60°) to give white crystals of the product identified above with melting point 150–151° C.

$[\alpha]_D^{25} = +92°$ (c.=.652 in CHCl$_3$); $\lambda_{max.}^{MeOH}$ 240 m$\mu$ ($\epsilon$=16,210); $\lambda_{max.}^{KBr}$ 5.88, 5.96, 6.16$\mu$

Example 24.—Preparation of 3-methoxy-17α-propyl-pregna-3,5-dien-20-one (XIIIC)

In the manner described in Example 5, a solution of 2.0 g. of 17α-propylpregn-4-ene-3,20-dione (IIIC, Example 23) 20 ml. of dioxane, 0.6 ml. of reagent methanol and 8 ml. of methyl orthoformate is treated with 0.52 ml. of a 5% sulfuric acid-dioxane solution (v./v.). The reaction mixture is allowed to stand at room temperature for 15 minutes, after which time the reaction is quenched with 4 ml. of pyridine. The resulting mixture is then poured into 150 ml. of water and stirred for several hours. The crude product is filtered and recrystallized from methanol to give the desired product in the form of white crystals;

$\lambda_{max.}^{CH_3OH}$ 239 m$\mu$ ($\epsilon$ 19,900); $\lambda_{max.}^{KBr}$ 5.89, 6.02, 6.12$\mu$

Example 25.—Preparation of 3-ethylenedioxy-17α-butyl-pregn-5-en-20-one (IID)

In the manner described in Example 1, a solution of 236 mg. of lithium in about 400 ml. of dry liquid ammonia is treated by dropwise addition with a solution of 6 g. of 3-ethylenedioxypregna-5,16-dien-20-one(I) in 190 ml. of tetrahydrofuran until the blue color is discharged. The reaction mixture containing the enolate salt, 3-ethylenedioxypregn-5-en-20-one 17-lithio derivative, then is treated with 7.06 ml. of n-butyl bromide and stirred at room temperature for 16 hours, whereafter a solution of 4.5 g. of ammonium chloride in 300 ml. of water is added. The crude product is isolated with methylene chloride and chromatographed on Florisil. The solids eluted with benzene in hold-back volumes 21 to 33 are recrystallized from methanol to give white crystals of desired product, melting point 96–102° C.;

$\lambda_{max.}^{KBr}$ 5.9, 9.02$\mu$

Example 26.—Preparation of 17α-butylprogestrone (IIID)

In the manner described in Example 4, a solution of 350 mg. of 3-ethylenedioxy-17α-butylpregn-5-en-20-one (IID, Example 25) in 45 ml. of methanol containing 5.25 ml. of 8% (v./v.) of sulfuric acid is refluxed for 40 minutes. The reaction is concentrated to turbidity, water is added and the mixture is extracted with methylene chloride. The combined extracts are washed with water, dried over magnesium sulfate and concentrated to dryness under reduced pressure. The residue is crystallized from methanol-water to give white crystals of the above product, melting point 103–106° C. Further recrystallization from petroleum ether (30–60°) raises the melting point to 114–115° C.;

$[\alpha]_D^{25} = +93$ (c.=.740 in CHCl$_3$); $\lambda_{max.}^{MeOH}$ 240 m$\mu$ ($\epsilon$=17,000); $\lambda_{max.}^{KBr}$ 5.88, 5.96, 6.16$\mu$

Example 27.—Preparation of 3-ethylenedioxy-17α-octylpregn-5-en-20-one (IIE)

In the manner described in Example 1, a solution of 270 mg. of lithium in about 300 ml. of liquid ammonia is treated, by dropwise addition, with a solution of 7 g. of 3-ethylenedioxypregna-5,16-dien-20-one (I) in 250 ml. of tetrahydrofuran until the blue color disappears. The reaction mixture containing the enolate salt, 3-ethylenedioxypregn-5-en-20-one 17-lithio derivative, then is treated with 12 ml. of octyl iodide in 12 ml. of tetrahydrofuran and stirred at room temperature for 18 hours, whereafter 10 g. of ammonium chloride is added, followed by 200 ml. of water and 200 ml. of ether. The crude product is isolated with ether and partitioned on a diatomaceous earth column with the system heptane-2-methoxyethanol. The solid eluted in the first hold-back volume is recrystallized from methanol to give white crystals, of the product above, melting point 93–95° C. The material has no significant ultraviolet absorption at 20 $\gamma$/ml.;

$[\alpha]_D^{25} - 35.4°$ (1.0% in CHCl$_3$); $\lambda_{max.}^{CCl_4}$ 5.86, 6.27, 9.00$\mu$

Example 28.—Preparation of 17α-octylprogesterone (IIIE)

In the manner described in Example 4, a solution of 1 g. of 3-ethylenedioxy-17α-octylpregn-5-en-20-one (IIE, Example 27) in 125 ml. of methanol containing 15 ml. of 8% (v./v.) sulfuric acid is refluxed for 45 minutes. The resulting crude material is chromatographed on silica gel. The product is eluted with 5% ether-in-benzene to give the desired product with $[\alpha]_D^{25} + 62.5°$ (0.75% in CHCl$_3$); $\lambda_{max.}^{MeOH}$ 241 m$\mu$ ($\epsilon$=15,800); $\lambda_{max.}^{CCl_4}$ 5.85, 5.91, 6.12$\mu$

Example 29.—Preparation of 17α-benzyl-3-ethylenedioxypregn-5-en-20-one (IIF)

In the manner described in Example 1, a solution of 387 mg. of lithium in about 400 ml. of liquid ammonia is treated, by dropwise addition, with a solution of 10 g. of 3-ethylenedioxypregna-5,16-dien-20-one (I) in 350 ml. of tetrahydrofuran until the blue color disappears. The reaction mixture, which contains the enolate salt, 3-ethylenedioxypregn-5-en-20-one 17-lithio derivative, then is treated with 15 ml. of benzyl chloride in 10 ml. of tetrahydrofuran and stirred at room temperature for 18 hours, whereafte 10 g. of ammonium chloride is added, followed by 250 ml. of water and 300 ml. of ether. The crude product is isolated with ether and chromatographed on silica gel. The solids eluted with 5% ether-in-benzene are recrystallized from ether-petroleum ether (60–70°) to give white crystals, melting point 175–180° C. This material has no significant ultraviolet absorption at 20 $\gamma$/ml.;

$[\alpha]_D^{25} - 26°$ (1.0% in CHCl$_3$); $\lambda_{max.}^{CCl_4}$ 5.86, 6.20, 9.10 14.20$\mu$

Example 30.—Preparation of 17α-benzylprogesterone (IIIF)

A solution of 500 mg. of 17α-benzyl-3-ethylenedioxypregn-5-en-20-one (IIF, Example 29) in 62.5 ml. of methanol containing 7.5 ml. of 8% (v./v.) sulfuric acid is refluxed for 45 minutes and then evaporated until solid is formed. Water is added and the solid collected by filtration to give 440 mg. of 17α-benzylprogesterone (IIIF), melting point 175–180° C. Two recrystallizations from acetone gives white crystals, melting point 194–196° C.;

$[\alpha]_D^{25} + 26°$ (0.97% in CHCl$_3$); $\lambda_{max.}^{MeOH}$ 241 m$\mu$ ($\epsilon$=16,000); $\lambda_{max.}^{KBr}$ 5.93, 6.15, 13.34, 14.00$\mu$

Example 31.—Preparation of 17α-benzyl-3-methoxy-pregna-3,5-dien-20-one (XIIID)

To a solution of 17α-benzylprogesterone (IIIF, Example 30) (1.0 g.) in dioxane (10 ml.), methanol (1 ml.) and methylorthoformate (4 ml.) is added a dioxane solution (0.5 ml.) containing 5% (v./v.) sulfuric acid. After 15 minutes the solution is quenched with excess pyridine, drowned in water and the product is extracted with methylene chloride. The combined extracts are washed with water, dried over magnesium sulfate and evaporated to dryness to give the desired enol ether having $\lambda_{max}^{CH_3OH}$ 238 m$\mu$ ($\epsilon$ 16,000) and $\lambda_{max}^{KBr}$ 5.88, 6.04, 6.13$\mu$

Example 32.—Preparation of 17α-benzylprogesterone (IIIF)

To a solution of 162 mg. of lithium in 500 ml. of anhydrous ammonia, 2.25 g. of 17α-acetoxy-3-methoxy-pregna-3,5-dien-20-one (XIIA, Example 7) in 27 ml. of tetrahydrofuran is added, with stirring, to discharge the blue color. The milky-white mixture containing the enolate salt, 3-methoxypregna-3,5-dien-20-one 17-lithio derivative, is treated with 3 ml. of redistilled benzyl chloride dissolved in 4 ml. of tetrahydrofuran and stirred for 20 hours.

To the resulting viscous liquid is added 2 g. of ammonium chloride followed by 100 ml. of water. After extraction of the aqueous layer with 100 ml. of methylene chloride, it is washed with an additional 50 ml. of methylene chloride. The organic layers are combined, washed with water and dried over anhydrous magnesium sulfate.

Evaporation of solvent leaves a brown syrup which is chromatographed on a silica gel column. During the chromatography, the methyl enol ether is hydrolyzed to the unsaturated ketone and the latter is collected on elution with 5% ether in benzene solution. The 17α-benzylprogesterone (IIIF) (recrystallized from ether-petroleum ether to give material with melting point at 194–197° C.) has an infrared spectra identical with that of material prepared in Example 30. A mixed melting point shows no depression.

Example 33.—Preparation of 17α-allyl-3-ethylenedioxy-pregn-5-en-20-one (IIG)

In the manner of Example 1, a tetrahydrofuran solution (350 ml.) containing 3-ethylenedioxypregna-5,16-dien-20-one (I) (10.0 g.) is added dropwise to a solution of lithium (387 mg.) in liquid ammonia (400 ml.) until the blue color is discharged. To the enolate salt, 3-ethylenedioxypregn-5-en-20-one 17-lithio derivative, a tetrahydrofuran solution of allyl chloride (9.5 ml.) is then added, dropwise, and the mixture is stirred for 16 hours. Ammonium chloride (10 g.) is added and then water. The mixture is extracted with methylene chloride and the combined extracts are washed with water, dried and evaporated to dryness to give an amber gum. The gum is triturated with hot ethanol and the insolubles are filtered hot. The ethanolic filtrate is evaporated to dryness and the resulting gum (6.3 g.) is chromatographed on a silica gel column (hold-back volume 400 ml.) which has been washed with benzene. The gum is placed on the column in a benzene solution and 400 ml. fractions are collected. The column is washed with benzene (800 ml.) and 3% ether-in-benzene (1200 ml.). These eluates are discarded. The next fraction (6) is obtained with 5% ether-in-benzene and contains 480 mg. of a crude glass. Better quality material (1.63 g.) is obtained with the same solvent system in the succeeding four fractions. An additional 450 mg. of lesser quality material is obtained in the next four fractions; also with 5% ether. The crude product (1.63 g.) is crystallized on rubbing with petroleum ether (B.P. 20–40°) and is recrystallized from methanol to give the above product IIG, melting at 108–117° C.;

$\lambda_{max}^{KBr}$ 5.88, 6.08, 10.81$\mu$

Example 34.—Preparation of 17α-allylprogesterone (IIIG)

17α-allyl-3-ethylenedioxypregn-5-en-20-one (IIG, Example 33) (1.4 g.) is dissolved in ethanol (10 ml.) containing water (2 ml.) and concentrated hydrochloric acid (1 ml.). The solution is refluxed 45 minutes, evaporated to dryness and rubbed with water to give a solid product. Several recrystallizations from ethanol-water and ethanol alone gives the above product IIIG melting at 150–152° C.

Example 35.—Preparation of 17α-allyl-3-methoxypregna-3,5-dien-20-one (XIIIE)

To a solution of 17α-allylprogesterone (IIIG, Example 34) (1.0 g.) in dioxane (10 ml.), methanol (1 ml.) and methyl orthoformate (4 ml.) is added a dioxane solution (0.5 ml.) containing 5% (v./v.) sulfuric acid. After 15 minutes the solution is quenched with excess pyridine, drowned in water and the product is extracted with methylene chloride. The combined extracts are washed with water, dried over magnesium sulfate and evaporated to dryness to produce the above product having $\lambda_{max}^{CH_3OH}$ 239 m$\mu$ ($\epsilon$ 16,200) and $\lambda_{max}^{KBr}$ 5.89, 6.04, 6.13$\mu$

Example 36.—Preparation of 3-ethoxy-17α-methyl-6-trifluoromethyl-pregna-3,5-dien-20-one (XXVIIIA)

In the manner described in Example I a solution of 17α-acetoxy-3-ethoxy - 6 - trifluoromethylpregna-3,5-dien-20-one (XXVII) [W. O. Godtfredsen and S. Vangedal, Acta Chem. Scand., 15, 1786 (1961)] in dry tetrahydrofuran is added dropwise to a solution of calcium in liquid ammonia until the blue color disappears. To the resulting mixture containing the enolate salt, 3-ethoxy-6-trifluoromethylpregna-3,5-dien - 20 - one 17-calcium derivative, methyl iodide is added and the reaction is stirred for 22 hours, whereafter ammonium chloride is added. Isolation with methylene chloride gives the product;

$\lambda_{max}^{MeOH}$ 256 m$\mu$ ($\epsilon$ 21,200); $\lambda_{max}^{KBr}$ 5.88, 6.02, 6.09$\mu$

Example 37.—Preparation of 3-ethoxy-17α-ethyl-6-trifluoromethyl-pregna-3,5-dien-20-one (XXVIIIB)

In the manner described in Example I, a solution of 17α-acetoxy-3-ethoxy-6-trifluoromethylpregna-3,5 - dien-20-one (XXVII), in dry tetrahydrofuran is added dropwise to a magnetically stirred solution of barium in liquid ammonia until the blue color disappears. Ethyl iodide is added to the mixture containing the enolate salt, 3-ethoxy-6-trifluoromethylpregna - 3,5 - dien - 20 - one 17-barium derivative, and the reaction is stirred for 20 hours, whereafter ammonium chloride is added and the product is isolated with ether. It has $\lambda_{max}^{MeOH}$ 255 m$\mu$ ($\epsilon$ 21,000) and $\lambda_{max}^{KBr}$ 5.90, 6.01, 6.10$\mu$

Example 38.—Preparation of 17α-methyl-6α-trifluoromethylprogesterone (XXIXA)

In the manner described in Example 10, 3-ethoxy-17α-methyl - 6 - trifluoromethylpregna - 3,5 - dien - 20 - one (XXVIIIA, Example 36) is hydrolyzed with methanolic hydrochloric acid to give the product XXIXA;

$\lambda_{max}^{MeOH}$ 234 ($\epsilon$ 16,000)

Example 39.—Preparation of 17α-ethyl-6α-trifluoromethylprogesterone (XXIXB)

A solution of 3-ethoxy-17α-ethyl - 6 - trifluoromethyl-pregna-3,5-dien-20-one (XXVIIIB) in methanol-3 N hydrochloric acid solution (3:1) is heated at reflux temperature for 20 minutes. The solution is distributed between methylene chloride and water, and the organic layer is washed successively with water, sodium bicarbonate solution and finally with water. Evaporation of the dried organic layer furnished the product XXIXB with $$\lambda_{max.}^{MeOH} \ 234 \ m\mu \ (\epsilon \ 15{,}800)$$

*Example 40.—Preparation of 3-methoxy-6-methylpregna-3,5,16-trien-20-one (XVIII)*

A solution of 6.00 g. of 6α-methyl-16-dehydroprogesterone (XVII) [D. Burn et al., J. Chem. Soc., 4092 (1957)] and 160 mg. of p-toluenesulfonic acid monohydrate in 50 ml. of 2,2-dimethoxypropane, 50 ml. of dimethylformamide and 2 ml. of methanol is heated at reflux temperature for 3 hours and cooled. After treatment with 900 mg. of sodium bicarbonate, the solution is poured with stirring into 1.5 l. of a cracked ice-water mixture. The precipitated solid is collected by filtration and recrystallized from methanol containing a trace of pyridine to give XVIII as crystals, melting point 134–144° C.;

$$\lambda_{max.}^{CH_3OH} \ 239 \ m\mu \ (\epsilon \ 28{,}000); \ \lambda_{max.}^{KBr} \ 5.99, \ 6.01, \ 6.12, \ 6.30\mu$$

*Example 41.—Preparation of 17α-ethyl-3-methoxy-6-methylpregna-3,5-dien-20-one (XXIA)*

A solution of 147 mg. of lithium in about 500 ml. of dry liquid ammonia is treated, by dropwise addition, with a solution of 4.23 g. of 3-methoxy-6-methylpregna-3,5,16-trien-20-one (XVIII, Example 40) in 50 ml. of tetrahydrofuran until the blue color is discharged. The reaction mixture containing the enolate salt, 3-methoxy-6-methylpregna-3,5-dien-20-one 17-lithium derivative, is then treated with 5 ml. of ethyl iodide and stirred at room temperature for 17 hours. Following the addition of 5.0 g. of ammonium chloride, the reaction mixture is distributed between ether and water. The ethereal layer is dried over sodium sulfate and taken to dryness to give 17α-ethyl-3-methoxy-6-methylpregna-3,5-dien-20-one (XXIA).

*Example 42.—Preparation of 17α-ethyl-6α-methylprogesterone (XXA)*

A methanol solution (200 ml.) containing 17α-ethyl-3-methoxy-6-methylpregna-3,5-dien-20-one (XXIA, Example 41) is treated with 50 ml. of 4 N hydrochloric acid solution and heated at reflux temperature for 50 minutes. The methanol is removed in vacuo until an oil separates and the concentrate is distributed between methylene chloride and water. The dried organic solution is taken to dryness and the residue is chromatographed on silica gel. The material eluted by a 5% ether-in-benzene solution is crystallized from dilute methanol to give the above product XXA as white needles, melting point 142–144° C.;

$$\lambda_{max.}^{MeOH} \ 240 \ m\mu \ (\epsilon \ 15{,}500); \ \lambda_{max.}^{KBr} \ 5.90, \ 5.98, \ 6.20\mu$$

*Example 43.—Preparation of 17α-hydroxy-3-methoxy-6-methylpregna-3,5-dien-20-one (XIX)*

A solution of 3.00 g. of 17α-hydroxy-6α-methylprogesterone and 80 mg. of p-toluenesulfonic acid monohydrate in 25 ml. of 2,2-dimethoxypropane, 25 ml. of dimethylformamide and 1 ml. of methanol is heated at reflux temperature for 3 hours. Sodium bicarbonate is added to the cooled solution which is then poured into a large volume of cracked ice and water. The precipitated solid is collected by filtration and recrystallized from methanol containing a trace of pyridine to give XIX as white crystals, melting point 130–145° C.;

$$\lambda_{max.}^{KBr} \ 2.81, \ 5.90, \ 6.02, \ 6.14, \ 8.25, \ 8.52\mu$$

*Example 44.—Preparation of 17α-ethyl-3-methoxy-6-methylpregna-3,5-dien-20-one (XXIA)*

To about 200 ml. of liquid ammonia is added small pieces of barium until the blue color persists for 15 minutes. To the dried ammonia is then added 757 mg. of barium; the blue mixture is stirred for 30 minutes, after which time the metal dissolves. A solution of 17-hydroxy-3-methoxy-6-methylpregna-3,5-dien-20-one (XIX, Example 43) in dry tetrahydrofuran is added dropwise until the blue color of the reaction is discharged; 1.44 g. of steroid is required. Ethyl iodide (5 ml.) is then added to the resulting enolate salt, 3-methoxy-6-methylpregna-3,5-dien-20-one 17-barium derivative, and the reaction is stirred for 6 hours and then allowed to stand at room temperature for 16 hours. Ammonium chloride (5.0 g.) is added followed by 100 ml. each of ether and water. The dried ethereal solution is evaporated to give the above product XXA.

This product is heated at reflux temperature with 20 ml. of methanol and 4 ml. of 3 N hydrochloric acid solution for 30 minutes. The solution is diluted with water and extracted with methylene chloride; the extract is washed repeatedly with water, dried over magnesium sulfate and taken to dryness. The residue is chromatographed on silica gel and the material eluted in the early fractions by a 5% ether-in-benzene solution is recrystallized from dilute methanol to give 17α-ethyl-6α-methylprogesterone (XXA) as white needles, melting point 133–141° C. The identity of this material with that from Example 42 is shown by spectral and mixture melting point comparisons.

*Example 45.—Preparation of 3-methoxy-6-methyl-17α-propylpregna-3,5-dien-20-one (XXIB)*

In the manner described in Example 1, a solution of 220 mg. of lithium in about 500 ml. of dry liquid ammonia is treated, by dropwise addition, with a solution of 6.00 g. of 3-methoxy-6-methylpregna-3,5,16-trien-20-one (XVIII, Example 40) in 75 ml. of tetrahydrofuran until the blue color is discharged. The reaction mixture containing the enolate salt, 3-methoxy-6-methylpregna-3,5-dien-20-one 17-lithium derivative, is then treated with 10 ml. of n-propyl iodide and stirred at room temperature for 18 hours. After the addition of 7.0 g. of ammonium chloride, the reaction is distributed between ether and water. The ether phase is separated, dried over magnesium sulfate and evaporated to give 3-methoxy-17α-propylpregna-3,5-dien-20-one (XXIB).

*Example 46.—Preparation of 6α-methyl-17α-propylprogesterone (XXB)*

A methanol solution (200 ml.) containing 3-methoxy-17α-propylpregna-3,5-dien-20-one (XXIB, Example 45) is heated at reflux temperature for one hour with 50 ml. of 4 N hydrochloric acid solution. The methanol is removed under reduced pressure until the solution becomes turbid. The concentrate is extracted with methylene chloride and the dried extract is taken to dryness to give the above product XXB with $$\lambda_{max.}^{MeOH} \ 240 \ m\mu \ (\epsilon \ 15{,}000) \ \text{and} \ \lambda_{max.}^{KBr} \ 5.90, \ 5.99, \ 6.21\mu$$

*Example 47.—Preparation of 6-methyl-3β-(2'-tetrahydropyranyloxy)-pregna-5,16-dien-20-one (XXIII)*

A solution of 7.60 g. of 6-methyl-16-dehydropregnenolone (XXII) [D. Burn et al., J. Chem. Soc., 4092 (1957)], 1.68 g. of dihydropyran and 500 mg. of p-toluenesulfonic acid hydrate in 100 ml. of benzene is mechanically stirred at room temperature for 24 hours. The solvent is removed and the residual gum is chromatographed on Florisil. The material eluted with benzene is crystallized from methanol to give 3.75 g. of white crystals, melting point 122–125° C.;

$$\lambda_{max.}^{KBr} \ 6.00, \ 6.30, \ 9.70\mu$$

*Example 48.—Preparation of 17α-ethyl-6-methyl-3β(2'-tetrahydropyranyloxy)-pregna-5-en-20-one (XXIVA)*

To a solution of 61 mg. of lithium in about 200 ml. of dry liquid ammonia is added a solution of 1.81 g. of 6-methyl - 3β-(2'-tetrahydropyranyloxy)-pregna-5,16-dien-20-one (XXIII, Example 47) in 25 ml. of tetrahydrofuran. The blue color is not discharged, and the addition of another 800 mg. of steroid is required to achieve this.

The resulting milky suspension of the enolate salt, 17α-ethyl - 6 - methyl-3β-(2'-tetrahydropyranyloxy)-pregna-5-en-20-one 17-lithium derivative, is treated with 5 ml. of ethyl iodide and stirred at room temperature for 18 hours. Ammonium chloride (2.0 g.) is added followed by 100 ml. each of water and ether. The dried ethereal solution is taken to dryness to give the above product XXIVA.

*Example 49.—Preparation of 17α-ethyl-6-methylpregnenolone (XXVA)*

A methanolic solution (100 ml.) containing 17α-ethyl-6 - methyl-3β-(2'-tetrahydropyranyloxy)-pregna-5-en-20-one (XXIVA, Example 48) is heated with 5 ml. of 8% sulfuric acid solution for 90 minutes. Most of the methanol is removed in vacuo and the residual mixture is distributed between additional water and methylene chloride. The dried organic phase is taken to dryness and the residue is chromatographed on silica gel. The material eluted by a 7½% ether-in-benzene solution is crystallized from acetone-petroleum ether (B.P. 60–70°) to give white crystals, melting point 208–217° C. Several recrystallizations from the same solvent pair gives 17α-ethyl-6-methylpregnenolone (XXVA) as white crystals, melting point 217–222° C.; no significant absorption in the ultraviolet;

$\lambda_{max.}^{KBr}$ 2.74, 2.82, 5.90, 9.35μ

*Example 50.—Preparation of 6-methyl-17α-propyl-3β-(2'-tetrahydropyranyloxypregn-5-en-20-one (XXIVB)*

To a solution of the enolate salt, 6-methyl-3β-(2'-tetrahydropyranyloxy)pregn - 5-en-20-one 17-lithium derivative, prepared as described in Example 48 from a solution of lithium in liquid ammonia and a solution of 6-methyl - 3β-(2'-tetrahydropyranyloxy)-pregna-5,16-dien-20-one (XXIII, Example 47) in tetrahydrofuran is added n-propyl iodide. After stirring the reaction at room temperature for 16 hours, ammonium chloride is added and the 6-methyl-17α-n-propyl-3β-(2'-tetrahydropyranyloxy)-pregn-5-en-20-one (XXIVB) is isolated by extraction with ether, drying of the ether extracts over magnesium sulfate and evaporation of the solvent.

*Example 51.—Preparation of 6-methyl-17α-propylpregnenolone (XXVB)*

Hydrolysis of 6-methyl-17α-propyl-3β-(2'-tetrahydropyranyloxy)-pregn-5-en-20-one (XXIVB, Example 50) is carried out in the manner described in Example 49 to give 6-methyl-17α-propylpregnenolone; no significant absorption in the ultraviolet region;

$\lambda_{max.}^{KBr}$ 2.83, 5.90, 9.35μ

*Example 52.—Preparation of 17α-ethyl-6-methylpregna-4,6-diene-3,20-dione (XXVIA)*

A solution of 300 mg. of 17α-ethyl-6-methylpregnenolone (XXVA, Example 49) and 1.800 g. of benzoquinone in 36 ml. of toluene is distilled until the distillation temperature reaches 110°, 6 ml. being collected. This solution is then treated with a solution of 300 mg. of aluminum isopropoxide in 4 ml. of toluene which has been previously distilled until the distillation temperature reaches 110°. The reaction mixture is heated at reflux with magnetic stirring for 45 minutes and then steam-distilled, 200 ml. of distillate being collected. The cooled residual solution is acidified with 5% sulfuric acid solution and extracted several times with ether. The combined ethereal solutions are washed thrice with 5% sulfuric acid solution and then with water. The ethereal solution is then carefully diluted with a 5% potassium hydroxide solution, care being taken not to agitate the mixture; the highly colored base layer is removed and this process is repeated. Finally, the ethereal solution is thoroughly washed with 5% potassium hydroxide solution and then water, dried over sodium sulfate and taken to dryness to give 295 mg. of amorphous residue. Crystallization from methanol gives 85 mg. of 17α-ethyl-6-methylpregnenolone as white crystals, melting point 208–215° C. From the filtrate there is isolated, by concentration, 17α - ethyl-6-methylpregna-4,6-diene-3,20-dione (XXVIA) as needles.

$\lambda_{max.}^{MeOH}$ 289 mμ (ε 24,000); $\lambda_{max.}^{KBr}$ 5.90, 6.00, 6.15, 6.30μ

*Example 53.—Preparation of 6-methyl-17α-propylpregna-4,6-diene-3,20-dione (XXVIB)*

By the process described in Example 52, a solution of 6-methyl-17α-propylpregnenolone (XXVB, Example 51) and benzoquinone in toluene is heated at reflux temperature with a solution of aluminum isopropoxide in toluene for 3 hours. By the isolation techniques described in Example 52, there is obtained the product (XXVIB) with $\lambda_{max.}^{MeOH}$ 290 mμ (ε 25,000) and $\lambda_{max.}^{KBr}$ 5.90, 6.00, 6.14, 6.31μ

*Example 54.—Preparation of 3-ethoxy-17α-methyl-19-norpregna-3,5-dien-20-one (XXXIA)*

An anhydrous tetrahydrofuran solution of 17β-acetoxy-17 - iso -3- ethoxy-19-norpregna-3,5-dien-20-one (XXX) [J. S. Mills, H. J. Ringold and C. Djerassi, J. Amer. Chem. Soc., 80, 6118 (1958)] is added to a solution of calcium in anhydrous liquid ammonia to the point of color discharge according to the procedure of Example 1. Treatment of the resulting enolate salt, 3-ethoxy-19-norpregna-3,5-dien-20-one 17-calcium derivative, with excess methyl iodide and work up of the reaction mixture by the method of Example 1 affords 3-ethoxy-17α-methyl-19-norpregna-3,5-dien-20-one as white crystals having $\lambda_{max.}^{CH_3OH}$ 239 mμ (ε 20,000); $\lambda_{max.}^{KBr}$ 5.88, 6.02, 6.10μ

*Example 55.—Preparation of 17α-methyl-19-norprogesterone (XXXIIA)*

Hydrolysis of 3 - ethoxy-17α-methyl-19-norpregna-3,5-dien-20-one (XXXIA, Example 54) with methanolic-aqueous hydrochloric acid by the procedure of Example 10 gives 17α-methyl-19-norprogesterone (XXXIIA) as white crystals with $\lambda_{max.}^{CH_3OH}$ 240 mμ (ε 16,000); $\lambda_{max.}^{KBr}$ 5.89, 5.98, 6.16μ

*Example 56.—Preparation of 3-ethoxy-17α-ethyl-19-norpregna-3,5-dien-20-one (XXXIB)*

Treatment of 17β - acetoxy - 17-iso-3-ethoxy-19-norpregna-3,5-dien-20-one (XXX) with a solution of calcium in liquid ammonia by the method of Example 1, reaction of the intermediate enolate salt, 3-ethoxy-19-norpregna-3,5-dien-20-one 17-calcium derivative, with excess ethyl iodide and work up of the reaction mixture by the procedure of Example 1 is productive of 3-ethoxy-17α - ethyl - 19-norpregna-3,5-dien-20-one (XXXIB) as white crystals;

$\lambda_{max.}^{CH_3OH}$ 239 mμ (ε 20,000); $\lambda_{max.}^{KBr}$ 5.89, 6.02, 6.10μ

*Example 57.—Preparation of 17α-ethyl-19-norprogesterone (XXXIIB)*

Hydrolysis of 3 - ethoxy - 17α-ethyl-19-norpregna-3,5-dien-20-one (XXXIB, Example 56) with methanolic-aqueous hydrochloric acid by the procedure of Example 10 gives 17α-ethyl-19-norprogesterone (XXXIIB) as white crystals with $\lambda_{max.}^{CH_3OH}$ 240 mμ (ε 16,500); $\lambda_{max.}^{KBr}$ 5.90, 5.98, 6.16μ

*Example 58.—Preparation of 17α-ethylpregna-1,4-diene-3,20-dione (VIB)*

A solution of 1 g. of 17α-ethylprogesterone (IIIB, Example 19) and 720 mg. of 2,3-dichloro-5,6-dicyanobenzoquinone in 20 ml. of purified dioxane is refluxed for 3 days. The cooled solution is filtered and taken to dryness under reduced pressure. The crude product is chromatographed on Florisil. The solids eluted with benzene are recrystallized from ether-petroleum ether (B.P. 60–70°) to give white crystals, melting point 146–

149° C. Recrystallization from the same solvent pair raises the melting point to 150–151° C.;

$[\alpha]_D^{25} +34.4°$ (1.1% in $CHCl_3$); $\lambda_{max.}^{MeOH}$ 243 m$\mu$ ($\epsilon$ 16,200);

$\lambda_{max.}^{CCl_4}$ 5.82, 5.98, 6.10, 6.20$\mu$

*Example 59.—Preparation of 17α-propylpregna-1,4-diene-3,20-dione (VIC)*

A dioxane solution (20 ml.) containing 17α-propylprogesterone (1.0 g.) (IIIC, Example 23) and 2,3-dichloro-5,6-dicyanobenzoquinone (720 mg.) is refluxed for 3 days. The solution is cooled and filtered from crystalline hydroquinone and is then taken to dryness. The product is obtained as white crystals by chromatography on Florisil and elution with benzene;

$\lambda_{max.}^{CH_3OH}$ 243 m$\mu$ ($\epsilon$ 16,000); $\lambda_{max.}^{CCl_4}$ 5.82, 6.00, 6.10, 6.22$\mu$

*Example 60.—Preparation of 17α-methylpregna-1,4-diene-3,20-dione (VIA)*

A dioxane (20 ml. purified) solution containing 17α-methylprogesterone (IIIA, Example 4) (1.0 g.) and 2,3-dichloro-5,6-dicyanobenzoquinone (655 mg.) is refluxed 16 hours. Additional quinone (95 mg.) is added and refluxing is continued for 3 days. The solution is allowed to cool and is then filtered from a crop of fine platelets (726 mg.). The solvent is distilled and the resulting black gum is dissolved in benzene and the solvent is again distilled. The residual black gum amounts to 497 mg. This gum is then chromatographed on a Florisil column consisting of 2 g. of Florisil (hold-back volume 3.8 ml.) which had been washed with 30 ml. of benzene. The gum is dissolved in a minimum amount of benzene and the solution is placed on the column. The column is then washed with benzene. The first 3 ml. of eluate (light brown in color) contains 145 mg. of crystalline product. The next 26 ml. contains an additional 56 mg. of crystalline material. The initial fraction is recrystallized from ether to give 17α - methylpregna - 1,4 - diene-3,20-dione (VIA), melting point 149–155° C.;

$\lambda_{max.}^{CH_3OH}$ 243 m$\mu$ ($\epsilon$ 16,400); $\lambda_{max.}^{KBr}$ 5.86, 5.98, 6.13, 6.20;

$[\alpha]_D^{25} +70°$ ($\pm16.7°$) (0.3%, $CHCl_3$)

polargraphic analysis indicates 89% 1,4-diene-3-one.

*Example 61.—Preparation of 6α-chloro-17α-ethyl pregn-4-ene-3,20-dione (VIIA)*

To a solution of 2 g. of 3-methoxy-17α-ethylpregna-3,5-dien-20-ene (XIIIB, Example 13) in 120 ml. of acetone is added a solution containing 637 mg. of sodium acetate in 5 ml. of water. The reaction mixture is cooled to about 0° and treated with 750 mg. of N-chloro-succinimide and 0.670 ml. of acetic acid. The reaction is stirred for 3 hours after which time water is added and the 6β-chloro-17α-ethylpregn-4-ene-3,20-dione is isolated with methylene chloride. The crude product is then treated with 50 ml. of acetic acid saturated with hydrogen chloride and allowed to stand at room temperature for 1.5 hours. The reaction mixture is poured into ice-water and the resulting solid is filtered and chromatographed on silica-gel. The solids eluted with 3–5% ether-in-benzene solution are recrystallized from ether-petroleum ether (30–60°) to give yellow crystals, melting point 156–159° C.;

$\lambda_{max.}^{MeOH}$ 234 m$\mu$ ($\epsilon$13,400); $\lambda_{max.}^{KBr}$ 5.9, 5.96, 6.16$\mu$; $[\alpha]_D^{25} +51°$ (c.=0.709 in $CHCl_3$)

*Example 62.—Preparation of 6α-chloro-17α-propyl pregn-4-ene-3,20-dione (VIIB)*

To a solution of 2 g. of 3 - methoxy - 17α - propyl pregna-3,5-dien-20-one (XIIIC, Example 24) in 120 ml. of acetone is added a solution of 637 mg. of sodium acetate in 5 ml. of water. The reaction mixture is cooled at 0° and treated with 750 mg. of N-chlorosuccinimide and 0.670 ml. of acetic acid. The reaction is stirred for 3 hours, after which time water is added and the 6β-chloro-17α-propylpregn-4-ene-3,20-dione is isolated with methylene chloride. The crude product is then treated with 50 ml. of acetic acid saturated with hydrogen chloride and allowed to stand at room temperature for 1.5 hours. The reaction mixture is poured into ice-water and the resulting solid is filtered and chromatographed on silica-gel. The solids eluted with 5% ether-benzene solution are recrystallized from ether-petroleum ether (30–60°) to give yellow crystals, $\lambda_{max.}^{MeOH}$ 235 m$\mu$ ($\epsilon$13,900); $\lambda_{max.}^{KBr}$ 5.89, 5.95, 6.17$\mu$

*Example 63.—Preparation of 17α-ethylpregn-4,6-diene-3,20-dione (VB)*

To a solution of 713 mg. of 3-methoxy-17α-ethylpregna-3,5-dien-20-one (XIIIB, Example 13) in 45 ml. of acetone is added a solution of 227 mg. of sodium acetate in 1.8 ml. of water. The reaction mixture is cooled to 0° and treated with 267 mg. of N-chlorosuccinimide and 0.239 ml. of acetic acid. The reaction mixture is stirred for 3 hours at 0°, after which time water is added and the 6β-chloro-17α-ethylpregn-4-ene-3,20-dione is isolated with methylene chloride. The crude 6β-chloro-17α-ethylepregn-4-ene-3,20-dione, without further purification, is dissolved in 15 ml. of dimethylformamide and is added dropwise to a suspension of 200 mg. of calcium carbonate in refluxing dimethylacetamide (30 ml.). The reaction is refluxed for 30 minutes, cooled and filtered from excess calcium carbonate. The filtrate is added to ice-water and the resulting product is filtered and air dried. The crude product is chromatographed on Florisil and the solids obtained by 2% ether-benzene elutions are recrystallized from methylene chloride-petroleum ether (30–60°) to give VB light yellow crystals, melting point 158–160° C.;

$\lambda_{max.}^{MeOH}$ 284 m$\mu$ ($\epsilon$20,900); $\lambda_{max.}^{KBr}$ 5.9, 6.05, 6.19. 6.3$\mu$; $[\alpha]_D^{25} = +51.6°$ (c.=0.601 in $CHCl_3$)

*Example 64.—Preparation of 17α-ethylpregna-4,6-diene-3,20-dione (VB)*

Hydrogen chloride gas is bubbled into a solution of 1.027 g. of 17α-ethylprogesterone (IIIB, Example 19) and 0.749 g. of recrystallized 2,3-dichloro-5,6-dicyano benzoquinone in 30 ml. of purified dioxane until crystallization is initiated. After standing for 30 minutes, the precipitated hydroquinone is collected and the filtrate diluted with methylene chloride, washed with water, 1% aqueous alkali and finally with water. Upon drying over anhydrous magnesium sulfate and evaporation of solvent, the crude product is recrystallized from methylene chloride-petroleum ether to give the above product VB as crystals with melting point 151–155° C.;

$\lambda_{max.}^{MeOH}$ 284 m$\mu$

*Example 65.—Preparation of 17α-propylypregn-4,6-diene-3,20-dione (VC)*

To a solution of 750 mg. of 3-methoxy-17α-propyl pregna-3,5-dien-20-one (XIIIC, Example 24) in 45 ml. of acetone is added a solution of 227 mg. of sodium acetate in 1.8 ml. of water. The reaction mixture is cooled to 0° and treated with 267 mg. of N-chlorosuccinimide and 0.239 ml. of acetic acid. The reaction mixture is stirred for 3 hours at 0°, after which time water is added and 6β-chloro-17α-propylpregn-4-ene-3,20-dione is isolated with methylene chloride. The crude 6β-chloro-17α-propylpregn-4-ene-3,20-dione, without further purification, is dissolved in 15 ml. of dimethylformamide and is added dropwise to a suspension of 200 mg. of calcium carbonate is refluxing dimethylacetamide (30 ml.). The reaction is refluxed for 30 minutes, cooled and filtered from excess calcium carbonate. The filtrate is added to ice-water and the resulting product is filtered and air dried. The crude product is chromatographed on Florisil and the solids obtained by 2% ether-benzene elutions are recrystallized from methylene chloride-petroleum ether (30–60°) to give white crystals;

$\lambda_{max.}^{MeOH}$ 284 m$\mu$ ($\epsilon$21,900); $\lambda_{max.}^{KBr}$ 5.89, 6.01, 6.2, 6.3$\mu$

Example 66.—Preparation of 17α-methylpregna-4,6-diene-3,20-dione (VA)

Chloranil (492 mg.) is added to a solution of 17α-methylprogesterone (IIIA, Example 4) (656 mg.) in anhydrous t-butanol (25 ml.) containing 1 ml. of glacial acetic acid. The suspension is stirred and refluxed for 3.5 hours, during which time the chloranil dissolves affording a yellow solution. The solvent is distilled to dryness, benzene-methanol is added and the solvent is again removed. The latter procedure is repeated and the resulting glass is dissolved in warm benzene and solvent is again distilled to dryness. Chloroform (20 ml.) is added to the residual glass and some insoluble material is filtered and discarded. The chloroform solution is washed with water (3 times) and then with 5% aqueous sodium hydroxide solution (4 times). The chloroform phase is evaporated to dryness and the residual glass, which can be crystallized on scratching and recrystallized from ether, is dissolved in 2 ml. of methylene chloride-benzene (4:1) and is placed on a column (hold back volume 4 ml.) consisting of 2 g. of Florisil, which had been washed with 30 ml. of methylene chloride-benzene (4:1).

The column is washed with the same methylene chloride-benzene system. The first 3.5 ml. of eluate is discarded, the next 3 ml. (pale green color) contains 64 mg. of crystalline product and an additional 50 mg. is obtained in the next 3 ml. fraction. Trituration of the 64 mg. gives the above product VA melting at 128–135° C.;

$\lambda_{max.}^{CH_3OH}$ 284 m$\mu$ ($\epsilon$ 25,100); $\lambda_{max.}^{KBr}$ 5.89, 5.99, 6.15, 6.28$\mu$; [$\alpha$]$_D^{25}$ +102° (0.244, chloroform)

Example 67.—Preparation of 17α-methylpregna-1,4,6-triene-3,20-dione (IVA)

In the manner described in Example 68, 17α-methylpregna-4,6-diene-3,20-dione (VA, Example 66) is treated with 2,3-dichloro-5,6-dicyanobenzoquinone in boiling dioxane for 22 hours. Following the isolation procedure of Example 68 gives the product with $\lambda_{max.}^{MeOH}$ 223, 255, 300 m$\mu$ ($\epsilon$ 10,500, 10,000, 12,000); $\lambda_{max.}^{KBr}$ 5.89, 6.02, 6.12, 6.21, 6.30$\mu$

Example 68.—Preparation of 17α-ethylpregna-1,4,6-triene-3,20-dione (IVB)

To a solution of 196 mg. (0.577 mmole) of 17α-ethylpregna-4,6-diene-3,20-dione (VB, Example 64) in 3 ml. of dioxane is added 193 mg. (0.832 mmole) of 2,3-dichloro-5,6-dicyanobenzoquinone and the reaction is refluxed for 20 hours. The solution is cooled and the hydroquinone is removed by filtration. The solvent is evaporated and the crude residue is dissolved in methylene chloride and is filtered through a Magnesol pad. The Magnesol is thoroughly washed with methylene chloride and the solvent taken to dryness. The residue is triturated with ether to give light yellow crystals, melting point 169–172° C.;

$\lambda_{max.}^{MeOH}$ 223, 255, 300 m$\mu$ ($\epsilon$ 11,000, 10,000, 12,000); $\lambda_{max.}^{KBr}$ 5.9, 6.01, 6.12, 6.2, 6.3$\mu$

Example 69.—Preparation of 17α-n-propylpregna-1,4,6-triene-3,20-dione (IVC)

In the manner described in Example 68, 17α-propylpregna-4,6-diene-3,20-dione (VC, Example 65) is treated with 2,3-dichloro-5,6-dicyanobenzoquinone in boiling dioxane for 20 hours. The product is isolated with methylene chloride to furnish material with $\lambda_{max.}^{MeOH}$ 224, 256, 301 m$\mu$ ($\epsilon$ 11,000, 10,000, 12,000) and $\lambda_{max.}^{KBr}$ 5.90, 6.00, 6.13, 6.21, 6.30$\mu$

Example 70.—Preparation of 3β-hydroxy-17α-methyl-5α-pregn-9(11)-en-20-one (XXXVII)

In the manner of Example 1, a tetrahydrofuran solution containing 3β-acetoxypregna-9(11),16-dien-20-one (XXXVI) [Callow and James, J. Chem. Soc., 4739 (1956)] (3.56 g.) is added dropwise to a solution of lithium (217 mg.) in liquid ammonia until the blue color is discharged. A tetrahydrofuran solution of methyl iodide (3 ml.) is then added to the resulting enolate salt, 3β-hydroxypregn-9(11)-en-20-one 17-lithio derivative. A clear solution forms, but in about 15 minutes turbidity develops. After 2 hours, 10 ml. more of methyl iodide is added and the mixture is stirred for 66 hours. Ammonium chloride is added and then water. The mixture is extracted (3 times) with ether and the combined ether extracts are dried and then evaporated to give an amber gum which is chromatographed on 200 g. of silica gel; 125 ml. fractions are collected. The column is washed with benzene containing increasing amounts of ether to 15% ether-in-benzene. A total of 1750 ml. of these washings are collected and discarded. The desired product is obtained in four fractions as a gum (640 mg.) on elution with 25% ether-in-benzene. An additional 168 mg. is obtained on elution with 35% ether-in-benzene. The gum (640 mg.) is triturated with acetone to give crystals melting at 160–170°. Several recrystallizations from acetone raise the melting point to 184–189°; no significant ultraviolet absorption in methanol at a concentration of 20γ/ml.;

$\lambda_{max.}^{CCl_4}$ 2.78, 5.87, 9.64$\mu$

Example 71.—Preparation of 17α-methylpregnenolone (XXXIV)

To a solution of 191 mg. of lithium in about 300 ml. of dry liquid ammonia is added dropwise a solution of 3.26 g. of 16-dehydropregnenolone acetate (XXXIII) in 35 ml. of tetrahydrofuran until the blue color disappears. The resulting solution of the enolate salt, pregnenolone 17-lithio derivative, is treated with 5 ml. of methyl iodide and stirred at room temperature for 16 hours. After the addition of a solution of 5 g. of ammonium chloride in 100 ml. of water, the crude product is isolated with ether. This product is subjected to partition chromatography on diatomaceous earth using a n-heptane-methanol system as described in Example 86. The material eluted in hold-back volumes 2 and 3 is recrystallized from petroleum ether (boiling point 60–70°) to give white crystals, melting point 178–180° C.; no significant ultraviolet absorption at 20γ/ml.;

$\lambda_{max.}^{KBr}$ 2.87, 5.92, 9.25, 9.42$\mu$

Example 72.—Preparation of 17α-methylpregnenolone (XXXIV)

To approximately 500 ml. of dry liquid ammonia is added 140 mg. of lithium. The resulting blue solution is treated with a solution of 17α-bromopregnenolone acetate (XXXVA) [P. L. Julian and W. J. Karpel, J. Am. Chem Soc, 72, 362 (1950)] in dry tetrahydrofuran until the blue color discharges. Methyl iodide (5 ml.) in 5 ml. of tetrahydrofuran is added to the resulting enolate salt, pregnenolone 17-lithio derivative, and the reaction is magnetically stirred for 18 hours. The mixture is treated with 5.0 g. of ammonium chloride and then with 100 ml. each of ether and water. The products are isolated from the ethereal solution in the usual manner and chromatographed on silica gel. The material eluted by a 5% ether-in-benzene solution is recrystallized from methanol to give pregnenolone acetate, melting point 149–153° C.

The material eluted by a 10% ether-in-benzene solution is recrystallized from petroleum ether (boiling point 60–70°) to give 17α-methylpregnenolone (XXXIV) as white crystals, melting point 174–177° C. The identity

*Example 73.—Preparation of 17α-methylpregnenolone (XXXIV)*

In the manner described in Example 1, a solution of 1.281 g. of barium in about 350 ml. of dry liquid ammonia is treated by dropwise addition with a solution of 1.985 g. of 17α-bromopregnenolone acetate (XXXVA) in 25 ml. of tetrahydrofuran until the blue color disappears. The reaction mixture containing the enolate salt, pregnenolone 17-barium derivative, then is treated with 10 ml. of methyl iodide and stirred at room temperature for 18 hours, whereafter a solution of 4.0 g. of ammonium chloride in 100 ml. of water is added. The crude product is isolated with methylene chloride and chromatographed on Florisil. The solids eluted with 5% ether-in-benzene in hold-back volumes 23 to 31 are recrystallized from methylene chloride-petroleum ether (60–70°) to give white crystals, melting point 179–183° C. This material is identical in all respects with that obtained in Example 71.

*Example 74.—Preparation of 17α-methylpregnenolone (XXXIV)*

In the manner described in Example 1, a solution of 650 mg. of barium in liquid ammonia is treated by dropwise addition with a solution of 17α-chloropregnenolone acetate (XXXVB) [D. J. Marshall and R. Gaudry, Can. J. Chem., 38, 1495 (1960)] in dry tetrahydrofuran until the blue color disappears. The resulting enolate salt, pregnenolone 17-barium derivative, is then stirred with 5 ml. of methyl iodide for 16 hours. Isolation of the product as described in Example 72 gives 17α-methylpregnenolone, melting point 179–183° C. Mixture melting point and spectral comparisons shows identity of this material with that of Example 71.

*Example 75.—Preparation of 17α-ethyl-6-fluoroprogesterone (XIVA)*

Perchloryl fluoride gas is bubbled rapidly into a cooled (—20°) solution containing 1 g. of 3-methoxy-17α-ethyl-pregna-3,5-dien-20-one (XIIIB, Example 13) in 15 ml. of pyridine for 4 minutes. After flushing with nitrogen for 10 minutes, the solution is poured into 2 N hydrochloric acid and stirred at room temperature for 1 hour and filtered. The crude solid is dissolved in 50 ml. of glacial acetic acid, into which anhydrous hydrogen chloride is bubbled for 1 hour. After standing at room temperature for an additional hour, the solution is poured into water and the resulting mixture is extracted with ether. The extracts are washed with 5% sodium carbonate solution, water, dried with anhydrous magnesium sulfate and evaporated to dryness under reduced pressure. The crude product is chromatographed on silica gel. The solids eluted with 10% ether-in-benzene are recrystallized from ether-petroleum ether (boiling point 60–70°) to give yellow crystals, $\lambda_{max.}^{MeOH}$ 234 m$\mu$ ($\epsilon$=14,000); $\lambda_{max.}^{KBr}$ 5.90, 5.96, 6.16$\mu$

*Example 76.—Preparation of 3-acetoxy-17α-methylpregna-3,5-dien-20-one (IXA)*

A solution of 2.0 g. of 17α-methylprogesterone (IIIA, Example 4) and 300 mg. of p-toluenesulfonic acid monohydrate in 80 ml. of isopropenyl acetate is slowly distilled for 24 hours; 30 ml. of distillate is collected. The cooled residual solution is poured onto cracked ice and stirred for 1 hour. The resulting mixture is extracted with methylene chloride and the extract is washed successively with water, sodium bicarbonate solution and finally with water. The dried organic extract is taken to dryness, and the residue is recrystallized from methanol to give white crystals of the above product IXA, melting point 149–163° C.;

$\lambda_{max.}^{KBr}$ 5.70, 5.88, 5.96, 6.09, 8.20–8.40, 8.90$\mu$

*Example 77.—Preparation of 3-acetoxy-17α-ethylpregna-3,5-dien-20-one (IXB)*

A solution of 1.378 g. of 17α-ethylprogesterone (IIIB, Example 19) and 0.250 g. of p-toluenesulfonic acid monohydrate in 50 ml. of acetic anhydride is allowed to stand at room temperature for 2.5 days whereafter it is poured into a water-cracked ice mixture and stirred until the acetic anhydride hydrolyzes. The mixture is extracted with methylene chloride, and the combined extracts are washed successively with water, sodium bicarbonate solution and water. The dried organic layer is taken to dryness, and the residue crystallizes from methanol as plates of the above product IXB, melting point 151–163° C.;

$\lambda_{max.}^{MeOH}$ 236 m$\mu$ ($\epsilon$ 19,000); $\lambda_{max.}^{KBr}$ 5.70, 5.89, 5.96, 6.09, 8.18–8.28$\mu$

*Example 78.—Preparation of 17α-ethyl-3-propionoxy-pregna-3,5-dien-20-one*

In the manner described in Example 77, a solution of 17α-ethylprogesterone (IIIB, Example 19) and p-toluenesulfonic acid monohydrate in propionic anhydride is kept at room temperature for 18 hours. After hydrolysis of the excess propionic anhydride, the product is isolated with methylene chloride and crystallized from methanol to give material with $\lambda_{max.}^{MeOH}$ 235 m$\mu$ ($\epsilon$ 19,200); $\lambda_{max.}^{KBr}$ 5.70, 5.90, 5.97, 6.10, 8.10–8.30$\mu$

*Example 79.—Preparation of 3-acetoxy-17α-propylpregna-3,5-dien-20-one (IXC)*

In the manner described in Example 77, 17α-n-propylprogesterone (IIIC, Example 23) is treated with acetic anhydride and p-toluenesulfonic acid for 18 hours. After hydrolysis of the excess acetic anhydride, the product is isolated with methylene chloride and crystallized from methanol to give the above product IXC with $\lambda_{max.}^{MeOH}$ 236 m$\mu$ ($\epsilon$ 19,000); $\lambda_{max.}^{KBr}$ 5.70, 5.90, 5.98, 6.10, 8.0–8.3$\mu$

*Example 80.—Preparation of 17α-ethyl-6α-fluoroprogesterone (XIVA)*

A slow stream of perchloryl fluoride is passed through a stirred suspension of 504 mg. of 3-acetoxy-17α-ethyl-pregna-3,5-dien-20-one (IXB, Example 77) in 25 ml. of 80% aqueous dioxane for 3 hours. All solid dissolves after 1 hour. After flushing with nitrogen the solution is diluted with water and extracted twice with methylene chloride. The combined extracts are washed with water, dried with anhydrous magnesium sulfate and evaporated to dryness. The crude product is allowed to stand at room temperature for 2 hours in 25 ml. of glacial acetic acid previously saturated with hydrogen chloride. The crude material, isolated by dilution with water followed by filtration, was adsorbed from benzene onto a silica gel column. The product eluted with 10% ether-in-benzene is identical in all respects to those described in Example 75.

*Example 81.—Preparation of 6α-fluoro-17α-propylpregn-4-ene-3,20-dione (XIVB)*

Treatment of a solution of 1 g. of 3-methoxy-17α-propylpregna-3,5-dien-20-one (XIIIC, Example 24) in 15 ml. of pyridine with perchloryl fluoride gas followed by isomerization with anhydrous hydrogen chloride in acetic acid according to the procedure described in Example 75 affords yellow needles of the above product XIVB with $\lambda_{max.}^{MeOH}$ 234 m$\mu$ ($\epsilon$=14,000) and $\lambda_{max.}^{KBr}$ 5.90, 5.96, 6.16$\mu$

Example 82.—Preparation of 17α-methyl-6β-nitro-progesterone

In the manner described in Example 83 a stirred solution of 800 mg. of 3-acetoxy-17α-methylpregna-3,5-dien-20-one (IXA, Example 76) in 25 ml. of ether is treated with 7 ml. of fuming nitric acid. The product is isolated in the manner described in Example 83 to give an amorphous solid, $\lambda_{max.}^{MeOH}$ 234–236 m$\mu$ ($\epsilon$ 9,000); $\lambda_{max.}^{KBr}$ 5.93, 6.18, 6.45$\mu$

Example 83.—Preparation of 17α-ethyl-6β-nitro-progesterone

A magnetically stirred suspension of 688 mg. of 3-acetoxy-17α-ethylpregna-3,5-dien-20-one (IXB, Example 77) in 20 ml. of ether is chilled to −20° C.; 5 ml. of fuming nitric acid is added dropwise over 40 minutes, the temperature being kept at −10° to −15° C. After completion of the addition, the resulting solution is stirred at 10° C. for 2 hours. Ice-water (20 ml.) then is added. The ethereal phase is separated and is washed with 5% sodium bicarbonate solution until the alkaline wash just turns brown and finally with water. The dried ethereal solution is taken to dryness to give the above product as a pale yellow amorphous solid, $\lambda_{max.}^{MeOH}$ 230–233 m$\mu$ ($\epsilon$ 8,000); $\lambda_{max.}^{KBr}$ 5.92, 6.16, 6.45$\mu$

Example 84.—Preparation of 6β-nitro-17α-propyl-progesterone (XC)

In the manner described in Example 83 a stirred suspension of 1.20 g. of 3-acetoxy-17α-n-propylpregna-3,5-dien-20-one (IXC, Example 79) in 30 ml. of ether is treated with 10 ml. of fuming nitric acid. The previously described isolation procedure gives the pale yellow product, $\lambda_{max.}^{MeOH}$ 232 m$\mu$ ($\epsilon$ 8,500); $\lambda_{max.}^{KBr}$ 5.93, 6.17, 6.45$\mu$

Example 85.—Preparation of 17α-methyl-6α-nitro-progesterone (XA)

A solution of 600 mg. of 17α-methyl-6β-nitroprogesterone (Example 82) in 60 ml. of 1% methanolic potassium hydroxide is kept at 5° for 10 minutes. The product is isolated in the manner described in Example 86 and is obtained as a solid with $\lambda_{max.}^{MeOH}$ 233 m$\mu$ ($\epsilon$ 13,700) and $\lambda_{max.}^{KBr}$ 5.93, 6.18, 6.45$\mu$

Example 86.—Preparation of 17α-ethyl-6α-nitro-progesterone (XB)

A solution of 500 mg. of 17α-ethyl-6β-nitroprogesterone (Example 83) in 50 ml. of 1% methanolic potassium hydroxide is kept at 5° for 5 minutes. The cold solution is diluted with ice-water and rapidly extracted with ether. The aqueous phase is then acidified by the addition of glacial acetic acid and extracted several times with ether. The combined ethereal solutions are washed well with water, dried and evaporated. The residue is dissolved in 2 ml. each of the lower phase and the upper phase of a n-heptane-methanol system and thoroughly mixed with 3 g. of diatomaceous earth. This mixture is packed atop a column prepared from 300 g. of diatomaceous earth and 30 ml. of the lower phase of the above solvent system. The column is eluted with the upper phase of the above solvent system; removal of the solvent from hold-back columns 8 and 9 gives yellow crystals. This product may be further purified by crystallization from ether-petroleum ether (boiling point 60–70°) to give yellow crystals, melting point 146–148° C.;

$\lambda_{max.}^{MeOH}$ 232–234 m$\mu$ ($\epsilon$ 14,000); $\lambda_{max.}^{KBr}$ 5.92, 6.16, 6.44$\mu$

Example 87.—Preparation of 6α-nitro-17α-propyl-progesterone (XC)

A solution of 1.00 g. of 6β-nitro-17α-n-propylprogesterone in 100 ml. of 1% methanolic potassium hydroxide is kept at 5° for 5 minutes. Isolation of the product in the manner described in Example 86 gives material with $\lambda_{max.}^{MeOH}$ 234 m$\mu$ ($\epsilon$ 13,900) and $\lambda_{max.}^{KBr}$ 5.92, 6.15, 6.45$\mu$

Example 88.—Preparation of 6-chloro-17α-ethylpregna-4,6-diene-3,20-dione (VIIIA)

A mixture of 200 mg. of 6α-chloro-17α-ethylpregn-4-ene-3,20-dione (VIIA, Example 61), 200 mg. of chloranil and 10 ml. of tertiary butyl alcohol is heated at reflux for 3 hours. The reaction mixture is cooled and filtered from excess chloranil. The filtrate is taken to dryness in vacuo. The residue is dissolved in methylene chloride, washed with water, 5% sodium hydroxide and again with water. The organic phase is dried over magnesium sulfate and taken to dryness in vacuo. The residue is extracted with boiling petroleum ether (30–60°) and concentrated to give a light yellow solid having $\lambda_{max.}^{MeOH}$ 284 m$\mu$ ($\epsilon$ 22,000)

Example 89.—Preparation of 6-chloro-17α-propylpregna-4,6-diene-3,20-dione (VIIIB)

A mixture of 200 mg. of 6α-chloro-17α-propylpregn-4-ene-3,20-dione (VIIB, Example 62), 200 mg. of chloranil and 10 ml. of tertiary butyl alcohol is heated at reflux for 3 hours. The reaction mixture is cooled and filtered from excess chloranil. The filtrate is taken to dryness in vacuo. The residue is dissolved in methylene chloride, washed with water, 5% sodium hydroxide and again with water. The organic phase is dried over magnesium sulfate and taken to dryness in vacuo. The residue is extracted with boiling petroleum ether (30–60°) and concentrated to give a yellow solid with $\lambda_{max.}^{MeOH}$ 285 m$\mu$ ($\epsilon$ 22,500)

Example 90.—Preparation of 6β-bromo-17α-ethylprogesterone

A solution of 1 g. of 17α-ethyl-3-methoxypregna-3,5-dien-20-one (XIIIB, Example 13), 800 mg. of potassium acetate, 4 ml. of water and 50 ml. of acetone is cooled to 0.5° C. in an ice-bath and in succession is added 995 mg. of N-bromosuccinimide and 0.54 ml. of acetic acid. The reaction mixture is stirred for 2.5 hours at 0–5° C. and then poured into water. The white solid is collected by filtration, washed well with water and air dried. The crude product is chromatographed on silica gel and the solid obtained by 5% ether-benzene elutions is recrystallized from ether-petroleum ether (30–60°) to give white crystals, melting point 131–132° C.;

$\lambda_{max.}^{MeOH}$ 246 m$\mu$

Example 91.—Preparation of 6β-bromo-17α-propylprogesterone

A solution of 1 g. of 3-methoxy-17α-propylpregn-3,5-dien-20-one (XIIIC, Example 24), 800 mg. of potassium acetate, 4 ml. of water and 50 ml. of acetone is cooled to 0–5° C. in an ice-bath and in succession is added 995 mg. of N-bromosuccinimide and 0.55 ml. of acetic acid. The reaction mixture is stirred for 2.5 hours at 0–5° C. and then poured into water. The white solid is collected by filtration, washed well with water and air dried. The crude product is chromatographed on silica gel and the solid obtained by 5% ether-benzene elutions is recrystallized from ether-petroleum ether (30–60°) to give white crystals, $\lambda_{max.}^{MeOH}$ 245 m$\mu$

Example 92.—Preparation of 6α-bromo-17α-ethylprogesterone (XVIA)

A solution of 350 mg. of 6β-bromo-17α-ethylprogesterone (Example 90), 20 ml. of acetic acid saturated with hydrogen bromide gas is allowed to stand at room temperature for 1.5 hours. The reaction mixture is poured into ice-water and the resulting solid is isolated by filtration. The product is recrystallized from ether to give white crystals, which after recrystallization from ether-petroleum ether (boiling point 30–60°) melts at 136–137° C., $$\lambda_{max.}^{CH_3OH} \ 237 \ m\mu$$

Example 93.—Preparation of 6α-bromo-17α-propylprogesterone (XVIB)

A solution of 350 mg. of 6β-bromo-17α-propylprogesterone (Example 91) in 20 ml. of acetic acid saturated with hydrogen bromide gas is allowed to stand at room temperature for 1.5 hours. The reaction mixture is then poured into ice-water and the resulting solid is isolated by filtration. The product is recrystallized from ether to give white crystals, $$\lambda_{max.}^{MeOH} \ 236 \ m\mu$$

Example 94.—Preparation of pregnenolone (XLI)

In the manner described in Example 1, a solution of lithium in liquid ammonia is treated with a solution of 16-dehydropregnenolone acetate (XXXIII) in tetrahydrofuran until the blue color is discharged. Ammonium chloride is added to the resulting enolate salt, pregnenolone 17-lithio derivative, and the solution is stirred for several hours to allow the excess ammonia to evaporate. Distribution of the reaction mixture between ether and water followed by evaporation of the ether phase gives the product. Recrystallization of this material from dilute alcohol gives needles, melting point 189–192° C. Admixture with authentic pregnenolone shows no depression of the melting range.

Example 95.—Preparation of 6-methylpregnenolone (XLV)

To a solution of lithium in dry liquid ammonia is added a solution of 6-methyl-3β-(2′-tetrahydropyranyloxy)-pregna-5,16-dien-20-one (XXIII, Example 47) in tetrahydrofuran until the blue color disappears. The solution containing the enolate salt, 6-methyl-3β-(2′-tetrahydropyranyloxy)-pregn-5-en-20-one 17-lithium derivative, is treated with ammonium chloride and stirred for several hours at room temperature to allow the excess ammonia to evaporate. The residual solution is diluted with water and extracted with ether. Evaporation of the dried ethereal extract gives 6-methyl-3β-(2′-tetrahydropyranyl)pregnenolone (XLIV) which is heated at reflux temperature with methanol and 4 N hydrochloric acid solution for one hour Concentration of this solution to turbidity, subsequent cooling and filtration gives white needles; purification by recrystallization from dilute methanol gives white needles, melting point 157–159° C., not depressed by admixture with known 6-methyl-pregnenolone.

Example 96.—Preparation of 6α-methylprogesterone (XLIII)

To a solution of 330 mg. of lithium in dry liquid ammonia is added dropwise a solution of 9.00 g. of 3-methoxy-6-methylpregna-3,5,16-trien-20-one (XVIII, Example 40) in 100 ml. of tetrahydrofuran until the blue color disappears. The reaction, which contains the enolate salt, 3 - methoxy-6-methylpregna-3,5-dien-20-one-17-lithio derivative, is then treated with 10 g. of ammonium chloride and stirred at room temperature for several hours to permit the ammonia to evaporate. The residual solution is distributed between ether and water and the dried ethereal solution evaporated to give 3-methoxy-6-methylpregn-3,5-diene-20-one (XLII);

$$\lambda_{max.}^{KBr} \ 5.85, \ 6.02, \ 6.11\mu$$

This material is hydrolyized with 4 N hydrochloric acid solution in methanol in the manner described in Example 10. Crystallization of the product from dilute methanol gives XLIII as white needles, melting point 120–122° C.;

$$\lambda_{max.}^{MeOH} \ 240 \ m\mu \ (\epsilon \ 15,500); \ \lambda_{max.}^{KBr} \ 5.85, \ 5.98, \ 6.20\mu$$

Example 97.—Preparation of 3-ethylenedioxypregn-5-en-20-one (XXXVIII)

To a solution of 278 mg. of lithium in approximately 500 ml. of dry ammonia is added dropwise a solution of 7.13 g. of 3-ethylene-dioxypregna-5,16-diene-20-one (I) in 250 ml. of tetrahydrofuran until the blue color is discharged. The colorless, cloudy solution of the enolate salt, 3-ethylenedioxy-pregn-5-en-20-one 17-lithio derivative, is treated with 10 g. of ammonium chloride and distributed between ether and water after stirring overnight. The dried ethereal solution is taken to dryness and the residue is chromatographed on silica gel. The material eluted by a 5% ether-in-benzene solution is recrystallized from petroleum ether (boiling point 60–70°) to give XXXVIII as white crystals, melting point 172–176° C.; no appreciable absorption in the ultraviolet;

$$\lambda_{max.}^{KBr} \ 5.84, \ 9.10\mu$$

Example 98.—Preparation of 3-methoxypregna-3,5-dien-20-one (XL)

To a solution of 156 mg. of lithium in dry liquid ammonia there is added dropwise a solution of 3-methoxypregna-3,5,16-trien-20-one (XV) in tetrahydrofuran until the blue color disappears. The reaction mixture which contains the enolate salt, 3-methoxy-pregna-3,5-dien-20-one 17-lithio derivative, is then treated with 10 g. of ammonium chloride and stirred at room temperature for several hours to allow the excess ammonia to evaporate. After distribution of the reaction between water and ether, the product is isolated from the dried ethereal solution and it has $$\lambda_{max.}^{MeOH} \ 239 \ m\mu \ (\epsilon \ 20,000) \ and \ \lambda_{max.}^{KBr} \ 5.90, \ 6.06, \ 6.15\mu$$

Example 99.—Preparation of progesterone (XXXIX)

A mixture of 200 mg. of 3-ethylenedioxypregn-5-en-20-one (XXXVIII, Example 97) and 5 ml. of 60% formic acid solution is heated on the steam bath until solution occurs and for 10 minutes thereafter. The hot solution is diluted to turbidity with water and cooled to give progesterone as white crystals, melting point 115–125° C. Several recrystallizations from dilute methanol furnishes white crystals, melting point 122–124° C. A mixture with authentic progesterone, melting point 127–129° C., melts at 124–128° C.

Example 100.—Preparation of progesterone (XXXIX)

A solution of 3-methoxypregna-3,5-dien-20-one (XL, Example 98) in 200 ml. of methanol and 50 ml. of 4 N hydrochloric acid solution is heated at reflux temperature for 1 hour. The methanol is removed under reduced pressure until solid separates. This material is collected by filtration and recrystallized from dilute methanol to give crystals, melting point 125–128° C. A mixture with authentic progesterone shows no depression of melting range.

Example 101.—Preparation of 3β-hydroxy-5α-pregn-9(11)-en-20-one (XLVI)

In the manner of Example 1, a tetrahydrofuran solution containing 3β-acetoxy-5α-pregna-9(11),16-dien-20-one (XXXVI) (3.56 g.) is added dropwise to a solution of lithium (217 mg.) in about 300 ml. of anhydrous ammonia until the blue color is discharged. Ammonium chloride (10 g.) is added to the resulting enolate salt, 3β - hydroxy - 5α - pregn - 9(11) - en - 20 - one 17 - lithio derivative; the ammonia is allowed to evaporate and the reaction mixture is distributed between ether and water. The ether phase is separated, dried over magnesium sulfate and evaporated to give 3β-hydroxy-5α-pregn-9(11)-en-20-one (XLVI) as white crystals melting at 189–192° C. after recrystallization from dilute methanol.

35

*Example 102.—Preparation of 3-methoxy-6,17α-dimethyl-pregna-3,5-dien-20-one (XXIC)*

In the manner described in Example 1 a solution of lithium in liquid ammonia is treated with a solution of 3-methoxy-6-methylpregna-3,5,16-trien-20-one (XVIII, Example 40) in dry tetrahydrofuran until the blue color discharges. The resulting enolate salt, 3-methoxy-6-methyl-pregna-3,5-dien-20-one 17-lithio derivative, is treated with methyl iodide and stirred for 18 hours. After addition of ammonium chloride, the 3-methoxy-6,17α-dimethyl-pregna-3,5-dien-20-one is isolated with ether. It has $\lambda_{max.}^{KBr}$ 5.88, 6.02, 6.10μ

*Example 103.—Preparation of 6β,7α-dichloro-17α-ethylprogesterone*

To 0.5 g. of 6-dehydro-17α-ethylprogesterone dissolved in 25 ml. of absolute ether and chilled in an acetone-dry ice bath, is added 2.1 ml. of a solution of chlorine dissolved in propionic acid (1.3 g. of chlorine in 25 ml. of propionic acid). After allowing the mixture to stand overnight at −25° C. it is poured into 50 ml. of water and the separated aqueous layer is extracted with an additional 25 ml. of ether. The ether extracts are combined, washed with water, aqueous saturated sodium bicarbonate solution and finally water, dried over magnesium sulfate and evaporated to dryness. Trituration of the crude residue (0.5 g.) with methanol gives crystals, melting point 198–202° C.;

$\lambda_{max.}^{CH_3OH}$ 238 mμ; $\lambda_{max.}^{KBr}$ 5.93μ

We claim:
1. The compound 6α-chloro-17α-ethylprogesterone.
2. The compound 17α-benzylprogesterone.
3. The compound 17α-methyl-6α-trifluoromethylprogesterone.
4. A process for the preparation of pregn-20-ones unsubstituted in the 11 and 21-positions which comprises treating a pregn-16-en-20-one unsubstituted in the 11 and 21-positions with a liquid ammonia solution of a member of the group consisting of alkali metals and alkaline earth metals followed by treatment with a hydrogen donor.
5. A process for the preparation of a member of the group consisting of 17-alkali metal pregn-20-ones unsubstituted in the 11 and 21-positions and 17-alkaline earth metal pregn-20-ones unsubstituted in the 11 and 21-positions which comprises treating a member of the group consisting of pregn-16-en-20-ones, 17-acyloxypregn-20-ones, 17-halopregn-20-ones and 17-hydroxypregn-20-ones, said pregn-20-ones being unsubstituted in the 11 and 21-positions with a member of the group consisting of alkali metals and alkaline earth metals in a solvent.
6. A process in accordance with claim 5, wherein the solvent is liquid ammonia.
7. The compound 3-ethylenedioxy-17-propylpregna-5-ene-20-one.
8. A compound of the formula

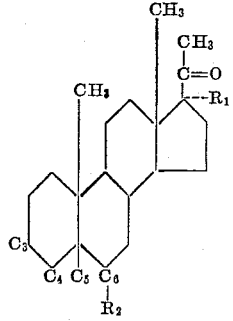

wherein R₁ is selected from the group consisting of alkyl groups having 2 to 8 carbon atoms, lower alkenyl and benzyl; R₂ is selected from the group consisting of hydrogen, lower alkyl and trifluoromethyl; and

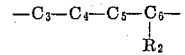

is selected from the group consisting of

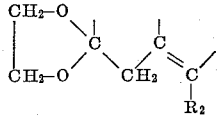

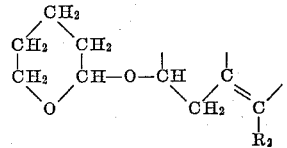

and

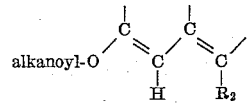

9. A process for the preparation of 3-methylenedioxy-pregna-5-en-20-ones unsubstituted in the 11 and 21-positions and having at the 17α-position a member selected from the group consisting of alkyl of 2 to 8 carbon atoms, lower alkenyl and benzyl which comprises treating the corresponding 3 - ethylenedioxypregna-5,16-diene-20-one with a member of the group consisting of alkali metal and alkaline earth metals in liquid ammonia followed by treatment with a member selected from the group consisting of alkyl halides of 2 to 8 carbon atoms, benzyl halide, and lower alkenyl halides.

10. A process for the preparation of 3-alkoxypregna-3,5-diene-20-ones unsubstituted in the 11 and 21-positions having at the 17α-position a member selected from the group consisting of alkyl groups of 2 to 8 carbon atoms, lower alkenyl and benzyl which comprises treating the corresponding 3-alkoxypregna-3,5,16-triene-20-ones with a member of the group consisting of alkali metal and alkaline earth metals in liquid ammonia followed by treatment with a member selected from the group consisting of alkyl halides of 2 to 8 carbon atoms, lower alkenyl halides and benzyl halides.

11. A process for the preparation of pregn-20-ones unsubstituted in the 11 and 21-positions and having at the 17α-position a member of the group consisting of alkyl of 2 to 8 carbon atoms, lower alkenyl and benzyl which comprises treating a member of the group consisting of pregn-16-en-20-ones, 17-acyloxypregn-20-ones, 17-halopregn-20-ones and 17-hydroxypregn-20-ones, said pregn-20-ones being unsubstituted in the 11 and 21-positions with a member of the group consisting of alkali metal and alkaline earth metals in a solvent followed by treatment with a member of the group consisting of alkyl halides of 2 to 8 carbon atoms, lower alkenyl halides and benzyl halide.

12. A process in accordance with claim 11 wherein the solvent is liquid ammonia.

13. A compound of the formula:

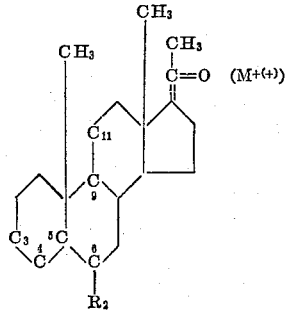

wherein M is selected from the group consisting of lithium, sodium, potassium, calcium and barium; $R_2$ is selected from the group consisting of hydrogen, trifluoromethyl and lower alkyl;

is selected from the group consisting of

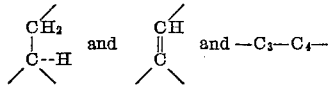

is selected from the group consisting of

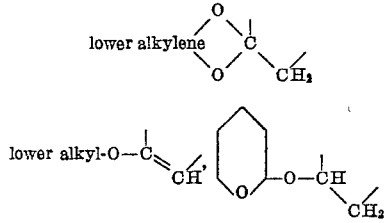

and

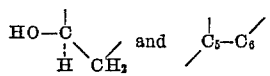

is selected from the group consisting of

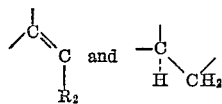

14. 17α-n-propyl-6-dehydroprogesterone.

References Cited

UNITED STATES PATENTS

| | | | |
|---|---|---|---|
| 2,891,079 | 6/1959 | Dodson et al. | 260—397 |
| 3,009,932 | 11/1961 | Reimann et al. | 260—397 |
| 3,014,932 | 12/1961 | Ringold et al. | 260—397 |
| 3,050,518 | 8/1962 | Bowers et al. | 260—239 |

FOREIGN PATENTS 854,343   11/1960   Great Britain.

OTHER REFERENCES

Mills et al.: J.A.C.S., vol. 80, 1958, pp. 6118–6120.

Ringold et al.: J.A.C.S., vol. 81, 1959, pp. 3845 and 3846.

Bowers et al.: J.A.C.S., vol. 82, 1960, pp. 4007–4012.

Degheni et al.: "Tetrahydron Letters No. 11," June 1962, pp. 489–491.

LEWIS GOTTS, *Primary Examiner.*

J. R. BROWN, E. ROBERTS, G. E. LANDE,
*Assistant Examiners.*